(12) United States Patent
Sekiguchi

(10) Patent No.: US 6,771,327 B2
(45) Date of Patent: Aug. 3, 2004

(54) LIQUID CRYSTAL DISPLAY DEVICE WITH AN INPUT PANEL

(75) Inventor: Kanetaka Sekiguchi, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 99 days.

(21) Appl. No.: 09/953,239

(22) Filed: Sep. 17, 2001

(65) Prior Publication Data

US 2002/0054261 A1 May 9, 2002

(30) Foreign Application Priority Data

Sep. 18, 2000 (JP) ........................................ 2000-281535
Sep. 26, 2000 (JP) ........................................ 2000-291935
Mar. 16, 2001 (JP) ........................................ 2001-075317

(51) Int. Cl.[7] .................... G02F 1/1335; G02F 1/1333; G02F 1/1345; G09G 3/36; G09G 5/00
(52) U.S. Cl. ............................ 349/12; 349/14; 349/122; 349/117; 349/149; 349/74; 345/104; 345/175
(58) Field of Search ................................. 345/104, 175; 349/122, 12, 14, 117, 119, 74, 149

(56) References Cited

U.S. PATENT DOCUMENTS

| | | | | |
|---|---|---|---|---|
| 5,774,107 A | * | 6/1998 | Inou | 345/104 |
| 5,831,702 A | * | 11/1998 | Ito | 349/12 |
| 6,088,069 A | * | 7/2000 | Farlow | 349/12 |
| 6,204,896 B1 | * | 3/2001 | Matsuhira et al. | 349/12 |
| 6,456,279 B1 | * | 9/2002 | Kubo et al. | 345/173 |
| 6,501,528 B1 | * | 12/2002 | Hamada | 349/158 |
| 6,572,941 B1 | * | 6/2003 | Murakami et al. | 428/34 |
| 6,611,299 B1 | * | 8/2003 | Fujii et al. | 349/12 |
| 2001/0008433 A1 | * | 7/2001 | Fujii et al. | 349/12 |
| 2001/0020985 A1 | * | 9/2001 | Hinata | 349/12 |
| 2001/0022632 A1 | * | 9/2001 | Umemoto et al. | 349/2 |
| 2001/0033347 A1 | * | 10/2001 | Kitahora et al. | 349/58 |

FOREIGN PATENT DOCUMENTS

| | | | |
|---|---|---|---|
| JP | 10-040004 A | * | 2/1998 |
| JP | 10-153786 A | * | 6/1998 |
| JP | 10-186136 | | 7/1998 |
| JP | 11-344694 | | 12/1999 |
| JP | 2000-206531 | | 7/2000 |
| JP | 2001-42353 | | 2/2001 |
| JP | 2001-134380 | | 5/2001 |

* cited by examiner

Primary Examiner—Tarifur R. Chowdhury
(74) Attorney, Agent, or Firm—Westerman, Hattori, Daniels & Adrian, LLP

(57) ABSTRACT

A liquid crystal display device comprises a liquid crystal display panel (4) made up by coupling a first substrate (1) and a second substrate (6), having an electrode (2, 7) provided on respective inner surfaces thereof facing each other, with a predetermined gap provided therebetween, and by filling the gap with a liquid crystal layer (15) in the gap, and an input panel (3) made up by coupling an upper substrate (21) and a lower substrate (26), both of which are transparent, having an electrode (22, 27) provided on respective inner surfaces thereof facing each other, with a predetermined gap provided therebetween, and by filling the gap with a filling medium (41), and the first substrate (1) on the visible side of the liquid crystal display panel (3) is disposed so as to be opposed to the lower substrate (26) of the input panel (3). A double-sided adhesive layer (44) having a surface area equivalent to that of a display region of the liquid crystal display panel (4) is disposed between the first substrate (1) and the lower substrate (26) to bonded both the substrates (1, 26) to each other.

19 Claims, 19 Drawing Sheets

LIQUID CRYSTAL DISPLAY DEVICE WITH AN INPUT PANEL

BACKGROUND OF THE INVENTION

1. Field of the Invention

The invention relates to a liquid crystal display device comprising an input panel for detecting input information, made up of a pair of transparent substrates with an electrode provided on respective inner surfaces thereof, facing each other, and disposed on the visible side of a liquid crystal display panel made up by filling a gap between a pair of substrates with liquid crystal, and in particular, to a reflective or transflective liquid crystal display device.

2. Description of the Related Art

Many matrix type liquid crystal display panels have recently been put to use for a display of various information terminals, instruments, personal computers, and so forth. In particular, for portable information equipment, there have been in widespread use reflective liquid crystal display devices capable of effecting display by making use of ambient light in order to realize lower power consumption or transflective liquid crystal display devices capable of effecting reflective display when the surroundings are bright and effecting transmissive display by lighting up an auxiliary light source incorporated therein when the surroundings are dark.

With the portable information equipment, while reduction in weight and thickness is important from the viewpoint of portability, use of a liquid crystal display panel having a large area is preferable from the viewpoint of visibility. For this reason, it has been in practice to reconcile miniaturization of a liquid crystal display device with enlargement of a display area thereof by installing an input panel as an input device on a display surface (display region) of the liquid crystal display panel such that display can be recognized through the input panel.

As the input panel for use in this case, there is available, for example, a touch panel of a resistive membrane type, made up of an upper substrate and a lower substrate, both transparent, with an upper electrode and a lower electrode provided on the inner surfaces of the respective substrates, facing each other, in such a way as to be deformable by applying pressure to either the upper substrate or the lower substrate (mainly the upper substrate), so that the upper substrate is caused to come into contact with the lower substrate as a result of such deformation, thereby enabling position coordinates of pressed parts of the upper substrate or the lower substrate to be read.

Although the touch panel of this type has been in widespread use because it is convenient to use, and has excellent recognizability while its fabrication cost is low, it has had a problem of causing deterioration in visibility of the liquid crystal display panel when it is disposed so as to overlay the display region of the liquid crystal display panel.

Cited as the reasons for such a problem are occurrence of absorption of light by respective light transmitting members, reflection due to the difference in refractive index between the light transmitting members in contact with each other, and occurrence of coloring caused by absorption or interference because the disposition of the touch panel on the visible side (the viewer's side) of the liquid crystal display panel will have the same effect as that in the case where a plurality of light transmitting members are disposed on the visible side of the liquid crystal display panel. Accordingly, there will arise problems that, as compared with the case of employing the liquid crystal display panel alone, display becomes darker, a contrast ratio deteriorates, coloring occurs, and a quantity of incident light decreases due to reflection of light by the touch panel.

Among the methods of solving these problems, there are available a method of reducing reflection by inserting an optical member, capable of reducing the difference in refractive index, between respective constituent members, a method of reducing a quantity of absorbed light by reducing the thickness of the respective constituent members, or a method of selecting constituent members having a low absorption ratio for use, and a method of reducing the number of the constituent members.

Further, there is another method of preventing reflection of light by the touch panel by disposing a polarizer on the visible side of the touch panel, and disposing a quarter-wave (lambda: λ) plate on the rear face side of the polarizer, however, in this case, there is the need for disposing one more sheet of polarizer between the liquid crystal display panel and the touch panel, and consequently, it follows that light is transmitted through two sheets of the polarizers twice when effecting reflective display, so that there will be an increase in absorption of light, resulting in darker display.

Besides the above, as a construction for preventing reflection of light, there is available a construction wherein a filling medium having a refractive index, equivalent to the mean between the refractive index of the upper electrode as well as the lower electrode, made up of a transparent and electrically conductive film, and the refractive index of air, is sealed between the upper substrate and the lower substrate of the touch panel, however, even with such a construction as described, reflection occurs between the lower substrate of the touch panel and a first substrate of the liquid crystal display panel, so that reduction in reflection of light has been found insufficient.

Further, particularly, in the case of a liquid crystal display panel using supertwisted nematic (STN) liquid crystal, and a reflective or transflective liquid crystal display panel having three-terminal thin film transistors (TFTs) or two-terminal thin film diodes (TFDs), and using twisted nematic (TN) liquid crystal or parallel alignment liquid crystal, there is the need for a reflector or a transflective reflector, and a polarizer as well as a retardation film on the viewer's side of the former. With the use of these constituent members, bright display and dark display are effected.

Accordingly, if a constituent member for preventing reflection of light from the touch panel is additionally laminated on top of such a liquid crystal display panel as described above, this will create problems such as an increase in the number of the constituent members thereof, an increase in quantity of light absorbed, and an increase in the weight as well as thickness of the liquid crystal display device, resulting in an increase in the cost of the device. Thus, improvement in these respects has been highly desired.

Furthermore, although there is another method of employing a film substrate for the upper substrate or lower substrate of the input panel, this has caused a problem that the display contents of the liquid crystal display panel is distorted or unevenness in reflective intensity is increased due to swelling (distortion) of the film substrate.

In order to solve the problem described, it is conceivable to adopt a constitution wherein the first substrate of the liquid crystal display panel doubles as the lower substrate of the input panel. In this case, however, during the process of fabricating a first electrode to be installed on the side of the first substrate of the liquid crystal display panel, facing a liquid crystal layer, or during the process of fabricating the liquid crystal display panel, there is involved the risk that a change occurs to a resistance value of the transparent and electrically conductive film of the input panel, depending on a temperature at which the process as described is carried out, and deterioration in unevenness or damage occurs to the transparent and electrically conductive film, so that the constitution described is not suitable for fabrication of a high quality liquid crystal display device.

SUMMARY OF THE INVENTION

In order to solve various problems described in the foregoing, it is an object of the invention to prevent deterioration of visibility of the liquid crystal display panel due to the effect of the input panel, and to realize reduction in the number of constituent members absorbing light, reduction in weight, a lower profile, reduction in cost, prevention of distortion of images in display, and enhancement in contrast, in a liquid crystal display device wherein an input panel such as a touch panel is disposed on the visible side of a liquid crystal display panel so as to overlay the latter, and display effected by the liquid crystal display panel is watched through the input panel.

To this end, a liquid crystal display device according to the invention comprises a liquid crystal display panel made up by coupling a first substrate and a second substrate having an electrode provided on respective inner surfaces thereof facing each other, with a predetermined gap provided therebetween, and by filling the gap with a liquid crystal layer, and an input panel made up by coupling an upper substrate and a lower substrate, both of which are transparent, having an electrode provided on respective inner surfaces thereof facing each other, with a predetermined gap provided therebetween, the first substrate on the visible side of the liquid crystal display panel being disposed so as to be opposed to the lower substrate of the input panel, wherein a double-sided adhesive layer having a surface area equivalent to that of a display region of the liquid crystal display panel is disposed between the first substrate and the lower substrate.

The gap between the upper substrate and the lower substrate of the input panel is preferably filled with a filling medium. The double-sided adhesive layer described above has preferably optical diffusibility. Further, the double-sided adhesive layer more elastic than spacers or a sealing member for maintaining the gap of the liquid crystal display panel is preferably used.

Otherwise, in place of the double-sided adhesive layer, a mutual filling medium (either the same medium as a filling medium filling the input panel or a medium different therefrom) may be provided between the first substrate of the liquid crystal display panel and the lower substrate of the input panel by sealing the same therein-between with a mutually sealing member.

With the liquid crystal display device having those features as described above, a reflector or a transflective reflector is preferably disposed on the face of the second substrate of the liquid crystal display panel, on the side of the liquid crystal layer, and at least one sheet of retardation film and one sheet of polarizer are preferably disposed in that order from the side of the upper substrate on the visible side of the upper substrate of the input panel. Further, the retardation films preferably include at least one sheet of twisted retardation film.

Or, an auxiliary light source is preferably disposed on the side of the second substrate, opposite from the side of the liquid crystal layer with a polarizer interposed therebetween.

Furthermore, switching elements may be disposed on the first substrate or the second substrate of the liquid crystal display panel so that display is effected by the liquid crystal display panel applying electric signals to the liquid crystal layer via the switching elements.

The upper substrate as well as the lower substrate of the input panel may be a retardation film.

Further, with the liquid crystal display device according to the invention, no filling medium may fill a gap between the upper substrate and the lower substrate of the input panel, and a second retardation film, a first retardation film, and a first polarizer may be disposed in that order by laminating one on top of the other from the side of the upper substrate of the input panel on the viewer's side of the upper substrate.

With the liquid crystal display device, the upper substrate and the lower substrate of the input panel are preferably substrates having a substantially even retardation value within the plane thereof or optically isotropic substrates having a retardation value nearly at zero, respectively.

Further, the first retardation film is preferably a half-wave film and the second retardation film is preferably a quarter-wave film.

With the liquid crystal display device, a transflective reflector is preferably disposed on the face of the second substrate of the liquid crystal display panel, on the side of the liquid crystal layer, and at least one sheet of retardation film, a second polarizer, and an auxiliary light source are preferably disposed on the side of the second substrate, opposite from the side of the liquid crystal layer, in that order from the side of the second substrate.

On the first substrate or the second substrate described above, switching elements may be disposed so that display is effected by the liquid crystal display panel described above by applying electric signals to the liquid crystal layer via the switching elements.

The input panel is preferably provided with positioning marks for aligning the absorption axis of the polarizer disposed on the touch panel with the alignment directions of liquid crystal molecules of the liquid crystal layer filling the gap of the liquid crystal display panel.

The upper substrate, the first retardation film, the second retardation film, and the first polarizer are preferably bonded to each other with an adhesive.

The external shape of the first polarizer is equivalent in size to or smaller than that of the first retardation film, the second retardation film, and the upper substrate, respectively.

With the respective liquid crystal display devices, it is preferable that a liquid crystal display panel connection portion for connecting the liquid crystal display panel to a driving circuit for the liquid crystal display panel is disposed in a peripheral region of the first substrate of the liquid crystal display panel, on one side thereof, while an input panel connection portion for connecting the input panel to a driving circuit for the input panel is disposed in a peripheral region of the lower substrate of the input panel, on one side thereof, the one side of the first substrate where the liquid crystal display panel connection portion is disposed is on the same side as the one side of the lower substrate where the input panel connection portion is disposed, and input panel connection means for connecting the input panel connection portion and the driving circuit for the input panel are installed along the side face of the lower substrate and the first substrate.

The input panel described above is preferably provided with at least four units of electrodes for detection of position, comprising at least a pair of X-electrodes and at least a pair of Y-electrodes, and wiring electrodes for providing wiring between each of the electrodes for detection of position and the input panel connection portion, and at least three lengths of the wiring electrodes are preferably disposed in a region where the same horizontally overlays the liquid crystal display panel connection portion as seen from the visible side.

Further, a first adhesive layer, a polarizer, a second adhesive layer, and a protective film are preferably disposed in that order from the side of the upper substrate of the input panel by laminating one on top of the other on the visible side of the upper substrate.

A first adhesive layer, at least one layer of retardation layer, a second adhesive layer, a polarizing layer, a third adhesive layer and a protective film may be disposed in that order from the side of the upper substrate by laminating one on top of the other on the visible side of the upper substrate.

The above and other objects, features and advantages of the invention will be apparent from the following detailed description which is to be read in conjunction with the accompanying drawings.

DETAILED DESCRIPTION OF THE PREFERRED EMBODIMENTS

Preferred embodiments of a liquid crystal display device according to the invention are described in detail hereinafter with reference to the accompanying drawings.

First Embodiment: FIGS. 1 to 9

First, the constitution of a portable information equipment, incorporating a liquid crystal display device with an input panel attached thereto according to a first embodiment of a liquid crystal display device of the invention, is described with reference to FIGS. 1 to 8.

Figure 1:
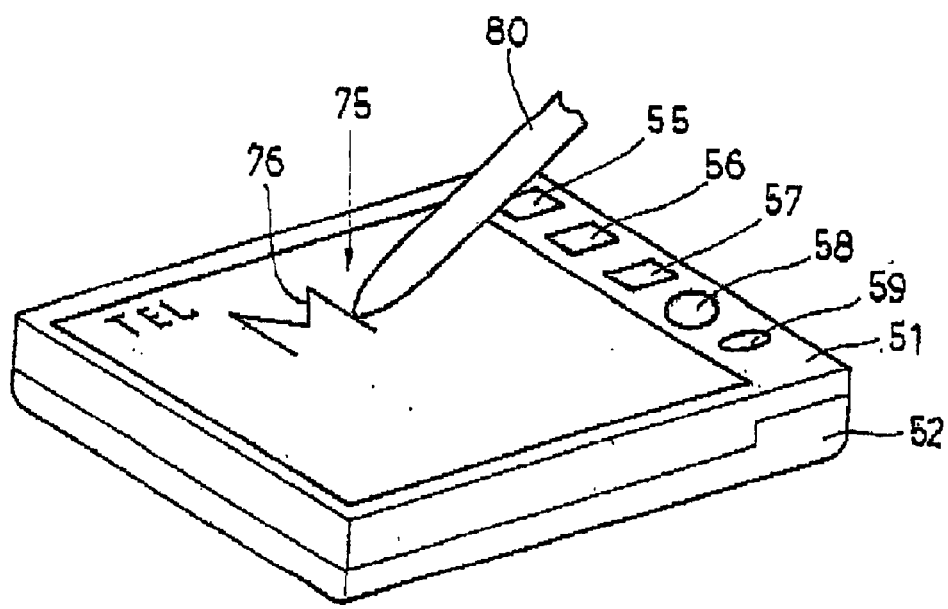
FIG. 1 is a perspective view schematically showing the external appearance of a portable information equipment incorporating a first embodiment of a liquid crystal display device with an input panel attached thereto according to the invention.
Figure 2:
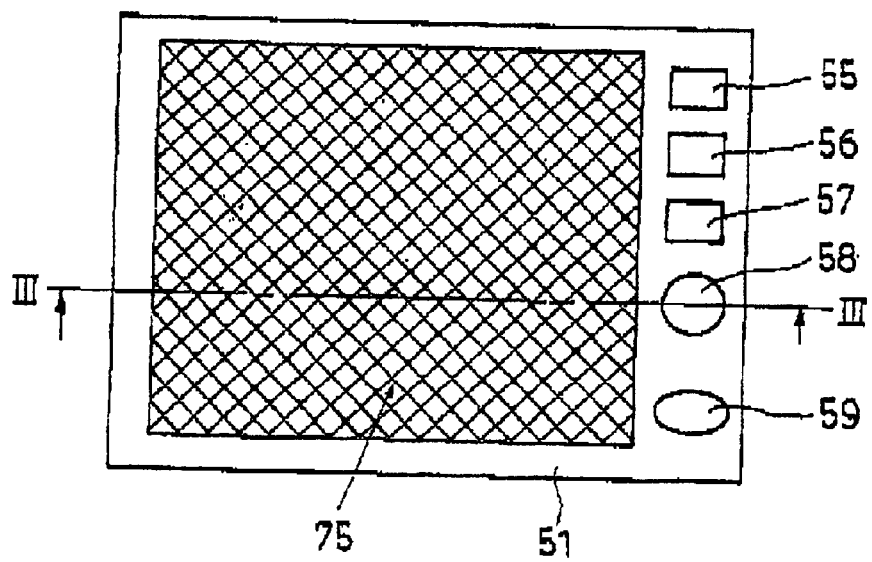
FIG. 2 is a schematic plan view of the portable information equipment.
Figure 3:
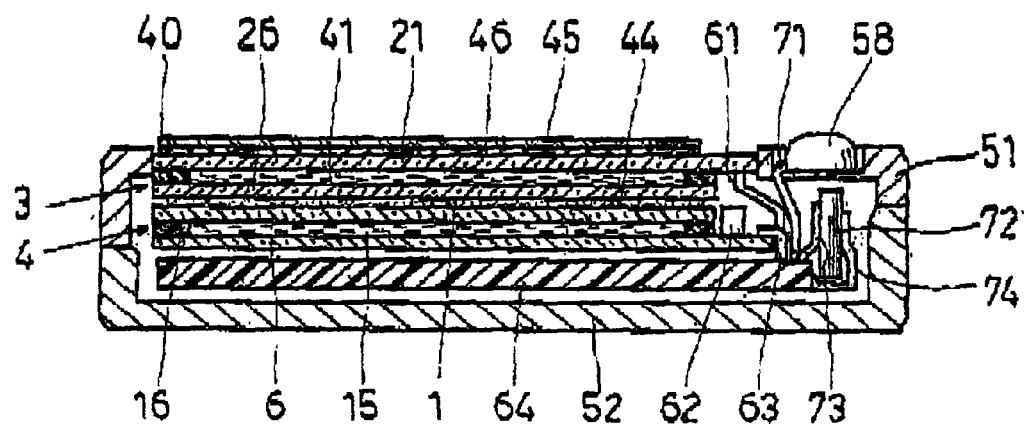
FIG. 3 is a sectional view taken on line III—III of FIG. 2.
Figure 4:
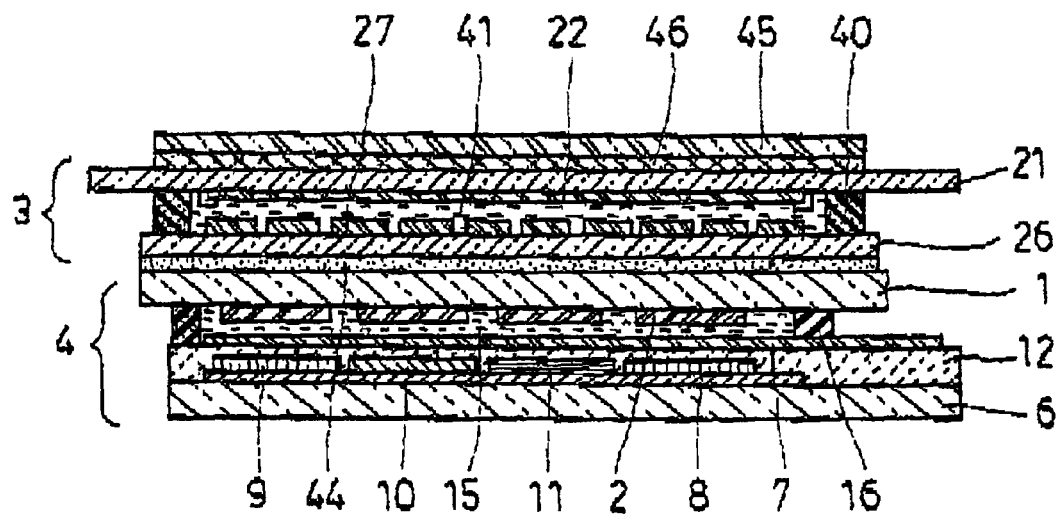
FIG. 4 is a partially enlarged sectional view of a liquid crystal display panel and an input panel, shown in FIG. 3.
Figure 5:
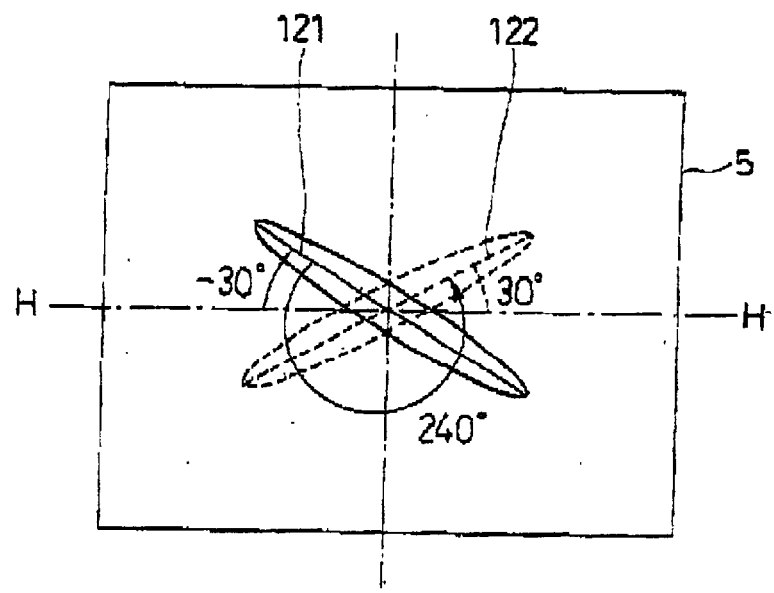
FIG. 5 is a view showing alignment directions of liquid crystal molecules of the liquid crystal display panel.
Figure 6:
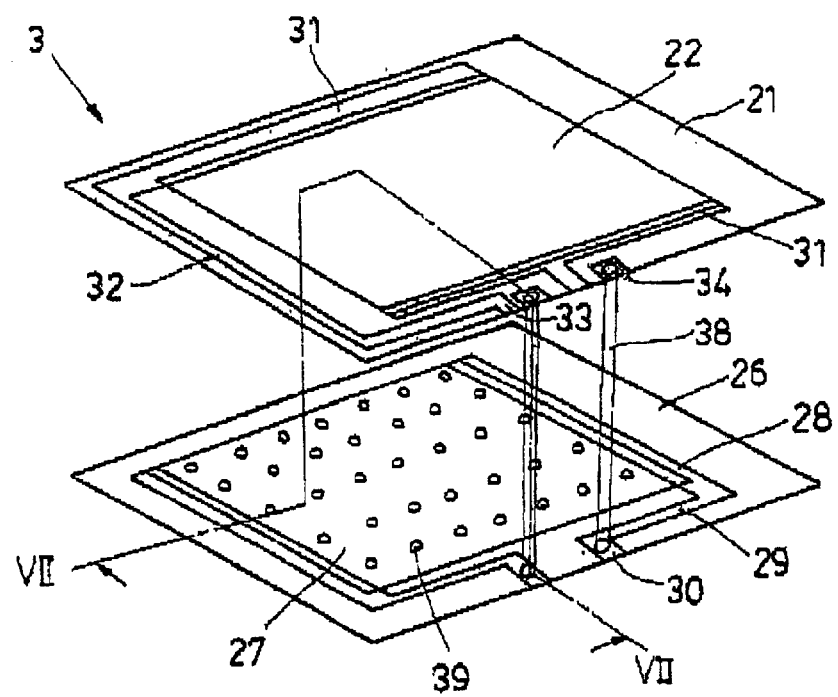
FIG. 6 is a schematic perspective view showing the exploded constitution of the touch panel.
Figure 7:
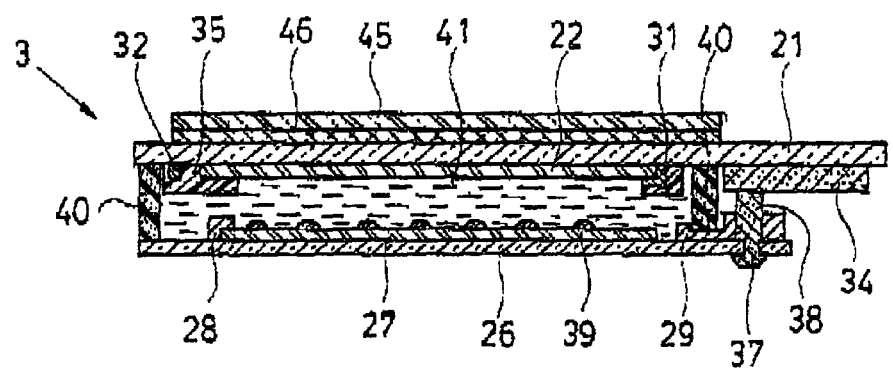
FIG. 7 is a sectional view of the touch panel taken on line VII—VII of FIG. 6.
Figure 8:
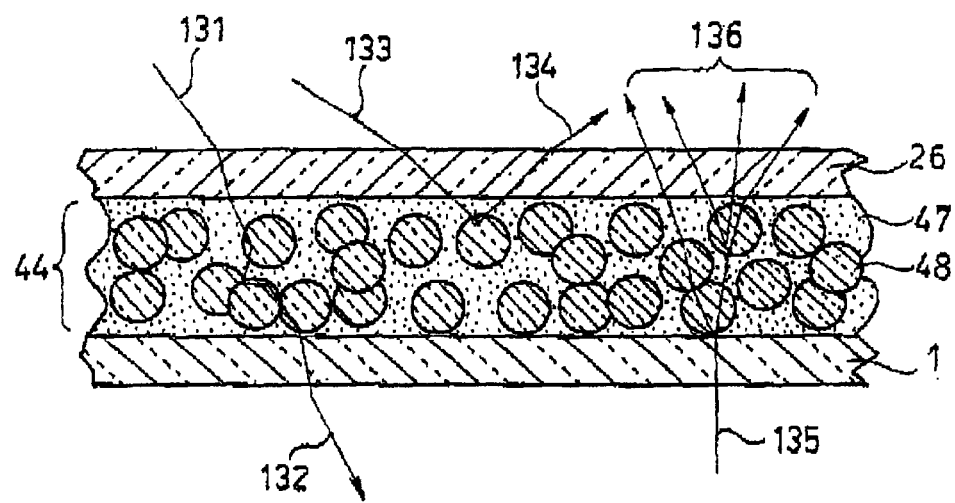
FIG. 8 is a partially enlarged sectional view of a double-sided adhesive layer having optical diffusibility.

FIG. 1 is a perspective view schematically showing the external appearance of the portable information equipment, FIG. 2 is a schematic plan view of the portable information equipment, FIG. 3 is a sectional view thereof, taken on line III—III of FIG. 2, FIG. 4 is a partially enlarged sectional view showing a liquid crystal display panel and an input panel in FIG. 3, FIG. 5 is a view showing alignment directions of liquid crystal molecules of the liquid crystal display panel, FIG. 6 is a schematic perspective view showing the exploded constitution of a touch panel of the liquid crystal display panel, FIG. 7 is a sectional view taken on line VII—VII of FIG. 6, and FIG. 8 is an enlarged sectional view of a double-sided adhesive layer having optical diffusibility.

The first embodiment of the invention is characterized in that the double-sided adhesive layer having an optical diffusibility is installed between the input panel and the liquid crystal display panel and supertwisted nematic (STN) liquid crystal is used in a liquid crystal layer.

As shown in FIGS. 1 and 2, the portable information equipment according to this embodiment has a display region 75 of the liquid crystal display panel, and upon inputting a letter 76 and so forth by applying pressure with an input pen 80 onto the touch panel which is the input panel installed on the visible side of the liquid crystal display panel, such input information is recognized by a detection circuit, thereby displaying the information as recognized such as the letter 76 and so forth on the liquid crystal display panel. FIG. 1 shows a state where the letter M is recognized.

Further, on top of a case 51 making up an enclosure together with a case back 52, there are provided a first button 55, a second button 56, a third button 57, used for changing display contents, a communication sensor 58, and an on/off switch 59. The communication sensor 58 is for transmitting/receiving or receiving signals, including a GPS sensor for providing information on location, or a Bluetooth transmit/receive sensor, an infrared radiation transmitting/receiving sensor, or so forth.

As shown in FIG. 3, inside the enclosure made up by the case 51 and the case back 52, there are disposed the liquid crystal display panel 4 and the touch panel 3 by laminating the latter on the visible side of the former.

The touch panel 3 is connected to a circuit board 64 through the intermediary of a touch panel flexible printed circuit (FPC) 61, transmitting or receiving given signals. The liquid crystal display panel 4 is connected to the circuit board 64 through the intermediary of a liquid crystal display panel FPC 63, transmitting or receiving given signals. Further, an integrated circuit (IC) 62 for converting signals of the circuit board 64 into display signals of the liquid crystal display panel 4 is mounted directly on a second substrate 6, making up the liquid crystal display panel 4, by the chip-on-glass (COG) method.

The circuit board 64 is provided with a battery anode terminal 73 and a battery cathode terminal 74 for making a connection with a battery 72. Further, the communication sensor 58 for use in communication with external equipment is connected with the circuit board 64 via a connection terminal 71 for communication.

As shown in FIG. 4, with the liquid crystal display panel 4 of the portable information equipment, a first substrate 1 and the second substrate 6, made up of a glass sheet of 0.5 mm thick, respectively, are coupled with a predetermined gap provided therebetween by a sealing member 16 made of epoxy resin, and the liquid crystal layer 15 is formed by filling the gap with liquid crystal and closing the gap with a closing member (not shown).

On the face of the second substrate 6, on the side of the liquid crystal layer 15, a reflector 8 made up of an aluminum film of 0.1 μm thick is disposed, and on top of the reflector 8, there are disposed red (R) color filters 9, green (G) color filters 10, and blue (B) color filters 11, a protective planarization layer 12 for maintaining the characteristics of the respective color filters and the reflector 8 and applying planarization to the surfaces thereof, and second electrodes 7 made up of a transparent and electrically conductive film patterned in the shape of a stripe. In FIG. 4, constituent members associated with connection with the circuit board 64 are omitted in illustration.

Further, first electrodes 2 made up of a transparent and electrically conductive film patterned in the shape of a stripe, crossing the second electrodes 7 at right angles, are installed on the face of the first substrate 1, on the side of the liquid crystal layer 15. Each of crossover points of the first electrodes 2 and the second electrodes 7 defines the address of a pixel.

As shown in FIG. 5, an alignment direction 121 of liquid crystal molecules in the upper part of the liquid crystal layer 15, on the side of the first substrate 1, is a direction rotated through 30° clockwise relative to the horizontal axis H—H of a display screen 5 (in the figure, an angle of clockwise rotation is designated by the minus sign), and an alignment direction 122 of liquid crystal molecules in the lower part of the liquid crystal layer 15, on the side of the second substrate 6, is a direction rotated through 30° counterclockwise. Accordingly, in the liquid crystal layer 15, there are adopted 240° supertwisted nematic (STN) liquid crystal with an alignment direction of liquid crystal molecules thereof, twisted through 240° from the side of the first substrate 1 to the side of the second substrate 6. The liquid crystal molecules are aligned by the agency of alignment layers not shown in the figure.

As shown in FIGS. 6 and 7, on a lower substrate 26 of the touch panel 3, made up of a transparent triacetylcellulose (TAC) film or a polyethyl sulfonate (PES) film, there are disposed lower electrodes 27 made up of a transparent and electrically conductive film, a pair of X-electrodes 28 made of silver paste, disposed at both ends of the lower electrodes 27, in the X-axis direction, and X-wiring electrodes 29 as well as X-transfer electrodes 30, connected with the respective X-electrodes 28. The lower electrodes 27 have resistance of several hundred ohms ($\Omega$), and the respective X-electrodes 28 have resistance of several ohms ($\Omega$).

The respective X-transfer electrodes 30 are disposed on peripheral parts of the lower substrate 26, and are electrically connected with respective X-connection electrodes 34 made of silver paste, disposed on the underside of an upper substrate 21, via an electrically conductive paste 38. The electrically conductive paste 38 is formed by pouring electrically conductive paste to the X-connection electrode 34 disposed on the underside of the upper substrate 21 through a transfer hole 37 defined in the lower substrate 26. Incidentally, in the actual process of fabricating the touch panel 3, fabrication is carried out with constituent members placed in a position inverted from that shown in the figures.

Further, dome-like spacers 39 are disposed on the lower electrodes 27. The dome-like spacers 39 are formed by a photolithographic process or a printing process, and are in a shape of 5 to 10 $\mu$m in height, and 10 to 15 $\mu$m in diameter.

The upper substrate 21 disposed opposite to the lower substrate 26 is a plastic substrate made up of a transparent triacetylcellulose (TAC) film or a polyethyl sulfonate (PES) film, or a glass sheet. On the face of the upper substrate 21, opposite to the lower substrate 26, there are disposed upper electrodes 22 made up of a transparent and electrically conductive film, a pair of Y-electrodes 31 made of silver paste, disposed at both ends of the upper electrodes 22, in the Y-axis direction, and Y-wiring electrodes 32 as well as Y-connection electrodes 33, connected with the respective Y-electrodes 31 (refer to FIG. 6). The upper electrode 22 has resistance of several hundred ohms ($\Omega$), and the respective Y-electrodes 31 have resistance of several ohms ($\Omega$).

Further, on the inner surface of the upper substrate 21, there is disposed a short-prevention insulation film 35 for prevention of short circuit with the electrodes installed on the lower substrate 26. Regions where the short-prevention insulation film 35 is disposed are parts opposite to the periphery of the lower electrodes 27, the Y-electrodes 31 or the Y-wiring electrodes 32.

As shown in FIG. 6, on parts of the periphery of the upper substrate 21, there are provided the Y-connection electrodes 33 and the X-connection electrode 34 for making a connection with the touch panel FPC 61 used for connection with the circuit board 64 shown in FIG. 3. Connection of the Y-connection electrodes 33 as well as the X-connection electrodes 34 with the touch panel FPC 61 is implemented by use of an anisotropic electrically conductive adhesive (not shown) composed of a thermosetting resin and electrically conductive particles mixed therein.

The upper substrate 21 and the lower substrate 26 are coupled together with a gap of 50 $\mu$m in width provided therebetween by use of a touch panel sealing member 40 made of urethane resin such that the upper electrode 22 is opposed to the lower electrode 27, and the gap is filled with a filling medium 41 composed of polydimethyl siloxane, glycerin, or paraffin.

In this connection, the refractive index of, for example, polydimethyl siloxane is about 1.4, the refractive index of the glass sheet is about 1.5, and the refractive index of an indium tin oxide (ITO) film which is the transparent and electrically conductive film is in a range of around 1.7 to 1.9. Accordingly, by filling the gap between the upper substrate 21 and the lower substrate 26 with the filling medium 41, the difference in the refractive index between the filling medium 41 and the ITO film can be reduced in comparison with the case of air with the refractive index thereof at 1 being present in the gap, so that reflection of light at the interface therebetween can be considerably reduced.

Further, the first substrate 1 disposed on the visible side of the liquid crystal display panel 4 shown in FIG. 4, and the lower substrate 26 of the touch panel 3 are bonded to each other with a double-sided adhesive layer 44. As shown in an enlarged state in FIG. 8, the double-sided adhesive layer 44 is composed of transparent spacers 48 made of plastics and an adhesive layer 47 made of a transparent adhesive having refractive index differing from that of the former, and has an area substantially equivalent to the display region of the liquid crystal display panel 4. Accordingly, the liquid crystal display panel 4 is bonded to the touch panel 3 with the double-sided adhesive layer 44.

The double-sided adhesive layer 44 has optical diffusibility, but have no optical anisotropy, and is capable of allowing light to pass therethrough with the direction of polarization and retardation maintained as they are. Further, the refractive index of the double-sided adhesive layer 44 is smaller than that of the transparent and electrically conductive film making up the upper electrodes 22 and the lower electrodes 27 of the touch panel 3, but greater than that of air as with the case of the filling medium 41.

Further, a constituent member more elastic than the sealing member 16 or spacers (not shown in the figure) used for maintaining the gap of the liquid crystal display panel 4 is preferably used for the double-sided adhesive layer 44.

As shown in FIG. 8, a first incident light ray 131 falling on the portable information equipment from outside through the touch panel 3 repeats reflection and refraction at the interfaces between the transparent spacers 48 and the adhesive layer 47, going out as a first outgoing light ray 132 towards the liquid crystal display panel 4. Meanwhile, another incident light ray, that is, a second incident light ray 133, also repeats reflection and refraction at the interfaces between the transparent spacers 48 and the adhesive layer 47, going out as a second outgoing light ray 134 towards the touch panel 3.

A third incident light ray 135 (the first outgoing light ray 132 as reflected from the reflector 8) entering from the side of the liquid crystal display panel 4 repeats reflection and refraction at the interfaces between the transparent spacers 48 and the adhesive layer 47, going out as third outgoing light rays 136 towards the touch panel 3.

It is possible to improve contrast in display effected by the liquid crystal display panel 4 by increasing a ratio of the first outgoing light ray 132 to the first incident light ray 131, and a ratio of the third outgoing light rays 136 to the third incident light ray 135 while decreasing a ratio of the second outgoing light ray 134 to the second incident light ray 133.

A product called EDA (trade name) manufactured by Simitomo 3-M Co., Ltd. is used this time for the double-sided adhesive layer 44, however, besides the same, use may be made of a white diffusion film made up of a thin plastic substrate in which transparent spacers having refractive index differing from that of the former are mixed, or a composite film made up of an adhesive layer provided on both sides of a white diffusion film. It has been demonstrated by tests that the double-sided adhesive layer 44 composed of a single layer of the adhesive layer 47, capable of achieving reduction in thickness, is effective in respect of blurring of images in display.

On the visible side of the upper substrate 21 of the touch panel 3, there are disposed a twisted retardation film (first retardation film) 46, and a polarizer (first polarizer) 45 in that order from the side of the upper substrate 21 by laminating one on top of the other.

With the twisted retardation film 46, molecules thereof on the side of the touch panel 3 (the underside thereof), are aligned in a direction oriented at an angle of 58° counterclockwise relative to the horizontal axis H—H of the display screen 5 shown in FIG. 5, and molecules on the upper side thereof are aligned in a direction oriented at an angle of 125° clockwise relative to the same horizontal axis H—H as described above, so that the molecules on the underside are twisted through 177° clockwise from the molecules on the upper side thereof. The polarizer 45 is an absorption type polarizer, and is disposed such that the absorption axis thereof is aligned in a direction oriented at an angle of 35° counterclockwise relative to the horizontal axis H—H of the display screen 5.

With such a configuration as described above, color display in excellent contrast can be effected simply by installing two films, that is, the polarizer 45 and the twisted retardation film 46, on top of the upper substrate 21 of the touch panel 3, so that excellent display quality can be ensured without deteriorating input sensitivity of the touch panel 3.

For the twisted retardation film 46, use is made of a film obtained by applying a liquid crystalline polymer having a twist structure to a triacetylcellulose (TAC) film or a polyethylene terephthalate (PET) film to which an alignment treatment has been applied, adjusting a twist angle thereof after turning the same into a liquid crystal state by heating at a high temperature on the order of 150° C., and subsequently, rapidly cooling the same to room temperature, thereby fixing a twisted condition thereof.

Otherwise, use may be made of a right-handed (clockwise) twisted retardation film having a twist angle of −177° and Δnd value, indicating birefringent tendency, of 730 nanometers (nm), made up of a film formed by applying a liquid crystalline polymer to a film separately prepared with an alignment treatment already applied thereto, fixing a twisted condition thereof, and subsequently, transferring the liquid crystalline polymer to a TAC film.

Further, because the polarizer 45 having a high polarization degree and a high transmittance is preferable, a type of material having transmittance at 45% and a polarization degree at 99.9% is used for the polarizer 45. Furthermore, by coating the face of the polarizer 45, on the visible side thereof, with a plurality of inorganic thin films having varying refractive indices by the vacuum deposition method or the sputtering method, or by coating the same with one or two layers of an organic material, it is possible to reduce reflectance at the surface of the polarizer 45, thereby improving display quality of the liquid crystal display panel 4.

Still further, with the portable information equipment, since an input is provided from the surface of the polarizer 45, a viewer touches the polarizer 45. Accordingly, for preventing contamination from occurring to the surface of the polarizer 45, the surface thereof is coated with fluororesin. Further, for preventing scratches and so forth from occurring to the polarizer 45, it is effective to form a hard coat layer made up of a silicon oxide film on the surface.

Furthermore, in the case where it is too expensive to apply such treatments as described onto the polarizer 45, it is also effective to bond a polyethylene terephthalate (PET) film, to which treatments for antireflection and hard coat have been applied, to the surface of the polarizer 45 with an acrylic adhesive.

With the liquid crystal display device with the input panel attached thereto, incorporated in the portable information equipment according to this embodiment of the invention, there exists no air layer between the lower substrate 26 of the touch panel 3 and the first substrate 1 of the liquid crystal display panel 4 because the double-sided adhesive layer 44 is provided, so that reflection at the interfaces therebetween can be prevented.

Because the reflection at the interfaces is prevented, it is possible to prevent polarized light entering after transmitted through the polarizer and the retardation film, disposed on the visible side of the touch panel 3, from returning to the viewer's side as light having the direction of polarization and retardation other than those of light subjected to modulation by the agency of the liquid crystal display panel 4. Accordingly, it is possible to prevent coloring of display and deterioration in contrast by use of nothing but constituent members required for effecting display of the liquid crystal display panel.

Furthermore, since the double-sided adhesive layer 44 disposed between the touch panel 3 and the liquid crystal display panel 4 has optical diffusibility, there in no need of causing the reflector 8 making up the liquid crystal display panel 4 to have optical diffusibility, and consequently, the reflector 8 is not required to be in a shape with bumps and dips formed on its surface, thereby enabling the constitution thereof to be simplified.

Figure 9:
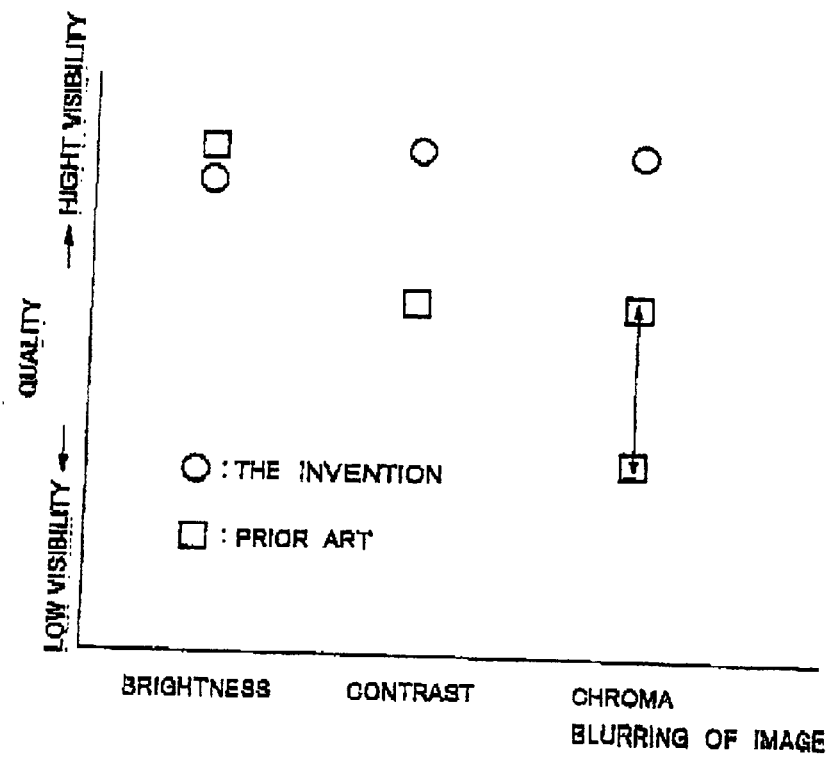
FIG. 9 is a view showing results of evaluation made on brightness, contrast, chroma and blurring of an image in the case of the portable information equipment according to the first embodiment, and a conventional liquid crystal display device with an input panel attached thereto wherein an touch panel is simply disposed on top of a liquid crystal display panel, respectively.

Now, referring to FIG. 9, display quality of the liquid crystal display device with the input panel attached thereto according to the first embodiment of the invention, and that of a conventional liquid crystal display device with an input panel attached thereto wherein a touch panel is simply disposed on top of a liquid crystal display panel will be described hereinafter. FIG. 9 is a view showing results of evaluation made on brightness, contrast, chroma, and blurring of images in connection with these liquid crystal display devices. The blurring of an image indicates a degree of mutual interference when one pixel only is turned into the display-on state, and pixels around the former are turned into the display-off state, and is recognized as defocusing of the image.

As shown in FIG. 9, brightness of display effected by the conventional liquid crystal display device is found somewhat brighter. This is because light reflected from the touch panel of a conventional construction is large in quantity, and is added to a quantity of reflected light at the time of reflective display, so that display is recognized seemingly brighter. On the other hand, with the constitution according to the present embodiment of the invention, since reflection of light from the touch panel 3 is reduced, brightness as a whole is rendered slightly lower in spite of an increase in portions of light reflected from the liquid crystal display panel 4.

With the conventional construction, contrast in display significantly deteriorates because light reflected from the touch panel is large in quantity as described above, and is added to reflected light in whole from the liquid crystal display panel regardless of display contents. That is, the light reflected from the touch panel ends up as a noise component acting against display of the liquid crystal display panel.

On the other hand, with the constitution according to the present embodiment of the invention, light reflected from the touch panel 3 can be reduced in quantity, and furthermore, changes in the direction of polarization and retardation value due to reflection at the touch panel 3 can also be prevented. Accordingly, the direction of polarization and the retardation value of light reflected from the reflector 8 and outgoing from the liquid crystal layer 15 can be efficiently conveyed to the polarizer 45 disposed on the visible side, so that contrast is significantly improved.

Further, with the conventional construction, because reflection from the touch panel and reflection from between the touch panel and the liquid crystal display panel occur, there will occur, for example, addition of noises to display of the liquid crystal display panel due to, for example, an interference color at the interface between an ITO film and an air layer, and defocusing of the edges of the image due to multiple reflections, resulting in deterioration of chroma and blurring of the images. In contrast, with the construction according to the present embodiment of the invention, since reflection from the touch panel 3 and reflection from between the touch panel 3 and the liquid crystal display panel 4 can be rendered extremely small, color shift and blurring of the image due to the interference at the interface can be reduced.

As is evident from the foregoing description, with the constitution according to the first embodiment of the invention, it is possible to prevent reflection inside the touch panel and reflection between the touch panel and the liquid crystal display panel. Further, because deterioration in transmittance due to reflection, coloring, and absorption of light can be prevented as a result of reduction in the number of the constituent members, it is possible to improve display quality of the liquid crystal display device at the time of reflective display, and particularly, to drastically improve contrast and chroma.

Further, with the present embodiment, the double-sided adhesive layer 44 having optical diffusibility is provided between the lower substrate 26 making up the touch panel 3 and the first substrate 1 making up the liquid crystal display panel 4, however, if another constituent member having optical diffusibility is disposed between the lower substrate 26 and the polarizer 45 disposed closest to the viewer, or on the viewer's side of the polarizer 45, this will enable reflection of incident light from an external light source to be reduced inside the touch panel 3 as well.

In this case, if diffusion intensity of the double-sided adhesive layer 44 is rendered higher and that of other constituent members is rendered lower, displacement of display of the liquid crystal display panel 4 can be suppressed. In particular, in the case of display using the color filters, it is possible to prevent mixing of colors between pixels in close proximity to each other, and blurring of images in display.

Figure 10:
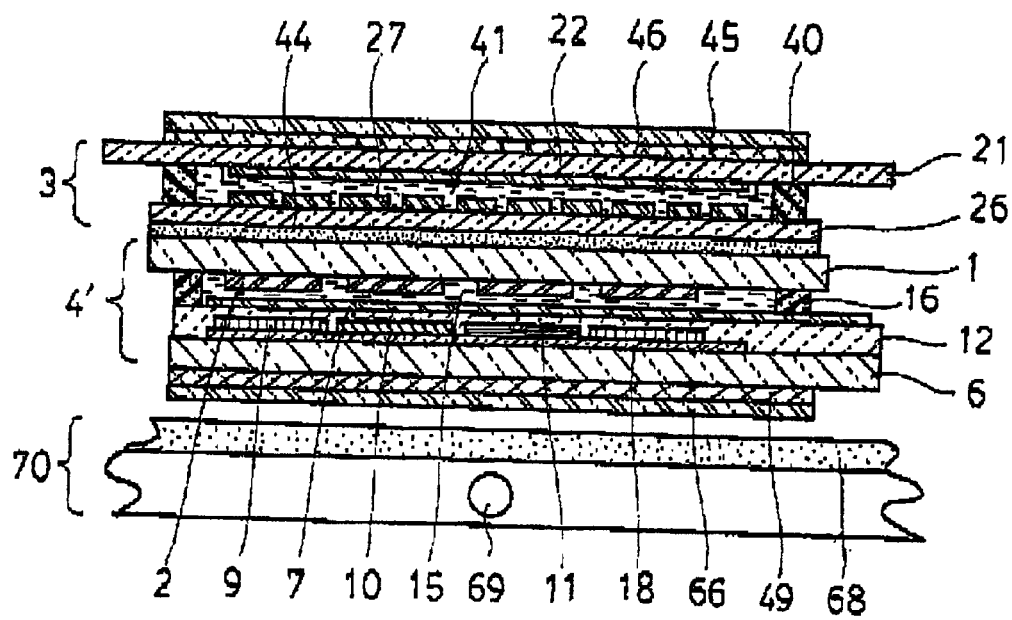
FIG. 10 is a sectional view similar to FIG. 4, showing the constitution of a liquid crystal display device with an input panel attached thereto according to a second embodiment of a liquid crystal display device of the invention.

Second Embodiment: FIG. 10

Next, a liquid crystal display device with an input panel attached thereto according to a second embodiment of a liquid crystal display device of the invention is described with reference to FIG. 10.

FIG. 10 is a sectional view similar to FIG. 4, showing the constitution of the liquid crystal display device. In FIG. 10, parts corresponding to those of the first embodiment are denoted by like reference numerals, and description thereof is omitted or simplified. Further, parts other than those shown in FIG. 10 are the same as those of the first embodiment, and description thereof is also omitted.

The present embodiment is characterized in that a reflector used in a liquid crystal display panel is a transflective reflector, and a retardation film, a polarizer, and an auxiliary light source are disposed on the side of a second substrate of the liquid crystal display panel, opposite from a liquid crystal layer.

With the liquid crystal display panel 4' of the liquid crystal display device shown in FIG. 10, a transflective reflector 18 made up of an aluminum film of 0.02 $\mu$m thick is disposed on the face of a second substrate 6 made up of a glass sheet of 0.5 mm thick, on the side of a liquid crystal layer 15, and on top of the transflective reflector 18, there are disposed red color filters 9, green color filters 10, blue color filters 11, a protective planarization layer 12 for maintaining the characteristics of the respective color filters and the transflective reflector 18 and applying planarization to the surfaces thereof, and second electrodes 7 each made up of a transparent and electrically conductive film patterned in the shape of a stripe, in that order.

The transflective reflector 18 is the so-called half mirror allowing portions of light to pass therethrough and the remainder of the light to be reflected. With the present embodiment, since the aluminum film making up the transflective reflector 18 is formed to a thickness of 0.02 $\mu$m, the transflective reflector 18 has a characteristic of transmitting about 10 to 20% of light therethrough while reflecting remaining 80 to 90% of the light.

Further, as with the case of the first embodiment, first electrodes 2 each made up of a transparent and electrically conductive film patterned in the shape of a stripe, crossing the second electrodes 7 at right angles, are installed on the face of a first substrate 1 on the side of the liquid crystal layer 15. Each of crossover points of the first electrodes 2 and the second electrodes 7 defines the address of a pixel.

As with the first embodiment, the first substrate 1 and the second substrate 6 are coupled with a predetermined gap provided therebetween by a sealing member 16 made of epoxy resin, and a liquid crystal layer 15 is formed by filling the gap with liquid crystal, thereby completing the liquid crystal display panel 4'.

In the same way as with the first embodiment, a double-sided adhesive layer 44 is provided on the first substrate 1 disposed on the visible side of the liquid crystal display panel 4' and is bonded to a lower substrate 26 of a touch panel 3 serving as an input panel. Since the constitution of the touch panel 3 is the same as that described in the first embodiment, description thereof is omitted. The same applies to a twisted retardation film 46 and a first polarizer 45, provided on the visible side of the touch panel 3.

On the face of the second substrate 6 of the liquid crystal display panel 4', on the side thereof opposite from the liquid crystal layer 15 (opposite from the visible side), there are disposed a second retardation film 49, a second polarizer 66, and an auxiliary light source 70 in that order from the side of the second substrate 6. For the auxiliary light source 70 used in the second embodiment, a backlight unit comprising a cold cathode 69, a reflection mirror (not shown), and an optical diffusing film 68 is adopted, however, besides the backlight unit as described above, a backlight unit comprising a white electroluminescent (EL) device or a light emitting diode (LED) device and an optical guide sheet may be used for the auxiliary light source 70.

The second retardation film 49 is a film of 70 μm thick formed by drawing polycarbonate (PC), and has a retardation value of 0.14 μm at a wavelength of 0.55 μm, equivalent to a quarter-wavelength (λ). For the second retardation film 49, use is made of a common retardation film whose refractive index includes a refractive index (nx) in the x-direction greater than a refractive index (ny) in the y-direction, and a refractive index (nz) in the z-direction equal to the refractive index (ny) in the y-direction. The second polarizer 66 is an absorption type polarizer equivalent to the first polarizer 45.

The second retardation film 49 is disposed such that the retardation axis thereof is in a direction oriented at an angle of 75° counterclockwise relative to the horizontal axis H—H of the display screen 5 shown in FIG. 5, and the second polarizer 66 is disposed such that the absorption axis thereof is in a direction oriented at an angle of 60° clockwise relative to the horizontal axis H—H described above so as to cross the absorption axis of the first polarizer 45 substantially at right angles.

With the aforementioned constitution, when the surroundings where the liquid crystal display device is used are bright, display in a reflective display mode making use of an external light source can be effected. In such a state, the same advantageous effect as described in the first embodiment can be obtained.

Meanwhile, when the surroundings where the liquid crystal display device is used are dark, display in a transmissive display mode can be effected by lighting up an auxiliary light source 70, thereby causing outgoing light therefrom to enter the device through the second polarizer 66 so as to be able to take advantage of the agency of the first polarizer 45, and optical changes occurring to the liquid crystal layer 15 as a result of voltage applied thereto.

Accordingly, the liquid crystal display device according to the present embodiment can be used in a variety of environments.

Incidentally, in the case of using the liquid crystal display device when the surroundings where the liquid crystal display device is used are not pitch-dark, but faintly bright, light from an external light source is reflected from the display surface of the liquid crystal display device, and goes out to the viewer's side, whereupon the light is added to light of display effected by the agency of the auxiliary light source 70, thereby bringing about deterioration in contrast. However, even when transmissive display is effected, it is possible to improve display quality of the liquid crystal display device, and in particular, to improve contrast and chroma by preventing reflection inside the touch panel, reflection between the touch panel and the liquid crystal display panel, and deterioration of transmittance due to reflection, coloring, and absorption of light as described in the foregoing. Furthermore, bright display can be effected by reducing the number of the constituent members.

Figure 11:
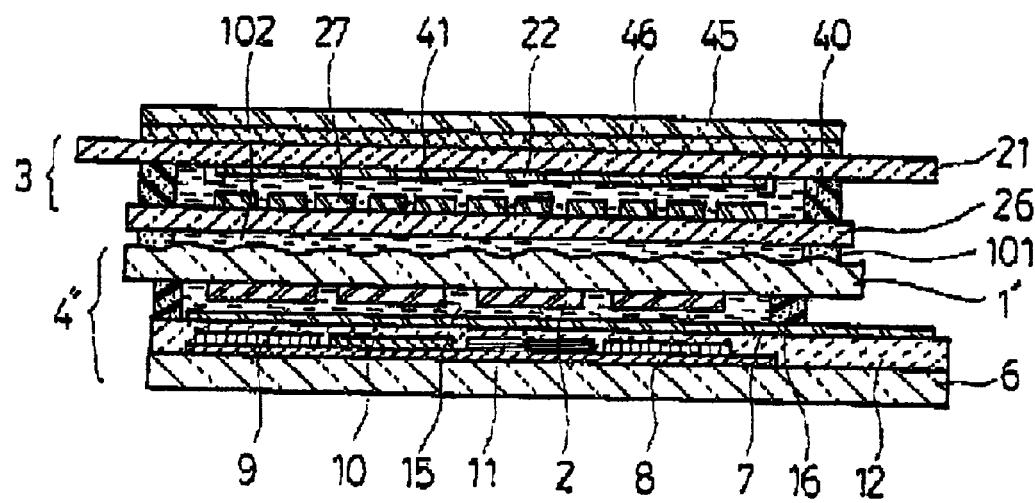
FIG. 11 is a sectional view similar to FIG. 4, showing the constitution of a liquid crystal display device with an input panel attached thereto according to a third embodiment of the invention.

Third Embodiment: FIG. 11

Next, a liquid crystal display device with an input panel attached thereto according to a third embodiment of a liquid crystal display device of the invention is described with reference to FIG. 11.

FIG. 11 is a sectional view similar to FIG. 4, showing the constitution of the liquid crystal display device. In FIG. 11, parts corresponding to those of the first embodiment are denoted by like reference numerals, and description thereof is omitted or simplified. Further, parts other than those shown in FIG. 11 are the same as those of the first embodiment, and description thereof is also omitted.

The present embodiment is characterized in that an inter-panel filling medium 102 which is a mutual filling medium is provided between a first substrate 1' making up a liquid crystal display panel 4" and a lower substrate 26 making up a touch panel 3 by sealing the same therein-between with a mutually sealing member 101.

The liquid crystal display panel 4" of the liquid crystal display device shown in FIG. 11 is substantially the same in constitution as the liquid crystal display panel 4 according to the first embodiment except that a sand blast treatment is applied to the surface of the first substrate 1', on the side thereof, opposite from a liquid crystal layer 15, and further, an etching treatment using an aqueous solution containing fluoric acid is applied to the surface, thereby forming an optically scattering surface in a hemispherical shape. The touch panel 3 has the same construction as described in the first embodiment. The same applies to a twisted retardation film 46 and a polarizer 45, disposed on the visible side of the touch panel 3.

With the present embodiment, a gap of 10 μm in width is provided between the lower substrate 26 making up the touch panel 3 and the first substrate 1' disposed on the visible side of the liquid crystal display panel 4", and both the substrates are bonded together with a mutually sealing member 101. Then, the gap is filled with the inter-panel filling medium 102.

For the inter-panel filling medium (mutual filling medium) 102, any medium may be used as long as it is a liquid having fluidity and the refractive index thereof is smaller than that of a transparent and electrically conductive film making up upper electrodes 22 and lower electrodes 27 of the touch panel 3, but is greater than that of air. However, if the same material as a filling medium 41 filling a gap between an upper substrate 21 and the lower substrate 26 of the touch panel 3 is used for the inter-panel filling medium 102, the filling medium 41 and the inter-panel filling medium 102 can be simultaneously sealed into both the gaps, respectively.

With the liquid crystal display device with the input panel attached thereto according to the present embodiment, as a result of sealing the inter-panel filling medium 102 in-between the lower substrate 26 of the touch panel 3 and the first substrate 1' of the liquid crystal display panel 4" as described above, an air layer is eliminated therebetween, so that reflection of light at these interfaces can be prevented as with the case of the first embodiment. Further, since deflection of the touch panel 3 occurring due to pressure applied to the upper substrate 21 when an input is provided to the touch panel 3 can be alleviated by the inter-panel filling medium 102 having fluidity and impact absorptivity, it is possible to prevent transfer of the deflection to the liquid crystal display panel 4", thereby lessening a change in the thickness of the liquid crystal layer 15, and also, to prevent occurrence of disorder in display. Besides, the same advantageous effects as described in the first embodiment will also be obtained.

Furthermore, if optical diffusibility is imparted to the inter-panel filling medium 102, the need for the first substrate 1' having optical diffusibility will be eliminated, so that the constitution of the liquid crystal display panel 4" can be simplified.

Furthermore, by installing a constituent member having optical diffusibility between the lower substrate 26 and the polarizer 45 disposed closest to the viewer, or on the viewer's side of the polarizer 45, reflection of incident light from an external light source can be reduced even inside the touch panel 3. In this case, if diffusion intensity of the inter-panel filling medium 102 is rendered higher and that of others is rendered lower, displacement of display of the liquid crystal display panel 4" can be suppressed. In particular, in the case of display using the color filters, it is possible to prevent mixing of colors between pixels in close proximity to each other, and blurring of images in display.

Figure 12:
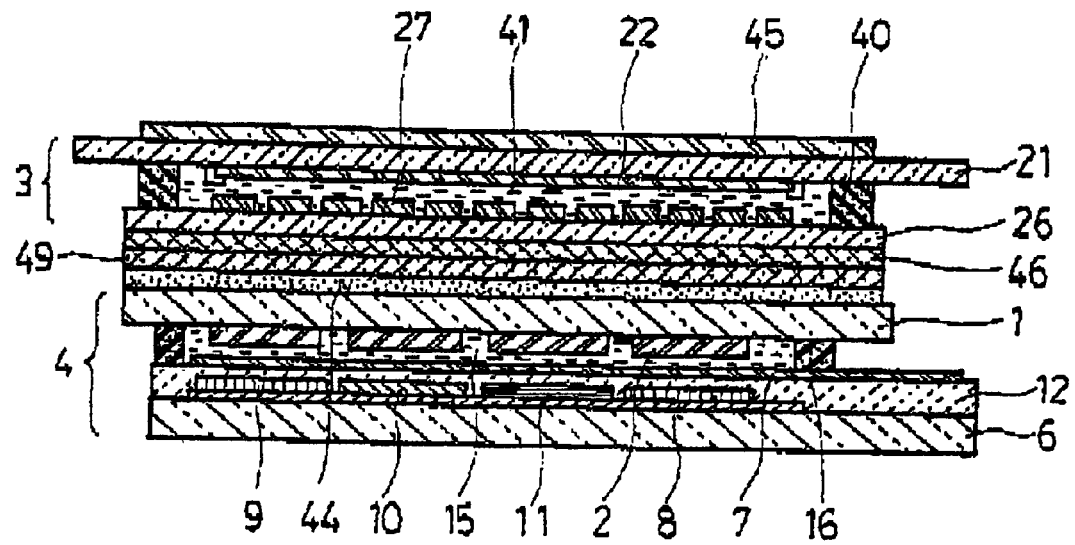
FIG. 12 is a sectional view similar to FIG. 4, showing the constitution of a liquid crystal display device with an input panel attached thereto according to a fourth embodiment of the invention.

Fourth Embodiment: FIG. 12

Next, a liquid crystal display device with an input panel attached thereto according to a fourth embodiment of a liquid crystal display device of the invention is described with reference to FIG. 12. FIG. 12 is a sectional view similar to FIG. 4, showing the constitution of the liquid crystal display device. In FIG. 12, parts corresponding to those of the first embodiment are denoted by like reference numerals, and description thereof is omitted or simplified. Further, parts other than those shown in FIG. 12 are the same as those of the first embodiment, and description thereof is also omitted.

The present embodiment is characterized by the construction thereof, wherein only a polarizer is disposed on the viewer's side of an upper substrate of a touch panel.

A liquid crystal display panel 4 of the liquid crystal display device shown in FIG. 12 is the same as the liquid crystal display panel 4 of the first embodiment, and description thereof is therefore omitted.

On the visible side of a first substrate 1 of the liquid crystal display panel 4, a double-sided adhesive layer 44 which is the same as that of the first embodiment is disposed, and on the visible side thereof, there are disposed a second retardation film 49 and a first retardation film 46 in that order by laminating one on top of the other. Further, the first retardation film 46 and a lower substrate 26 of the touch panel 3 which is an input panel are bonded to each other with an adhesive.

Since the touch panel 3 as well is the same as that described in the first embodiment, description thereof is omitted.

The first retardation film 46 is a transparent film of 70 μm thick formed by drawing polycarbonate (PC), has a retardation value of 0.72 μm at a wavelength of 550 nm, and is disposed such that the retardation axis thereof is in a direction oriented at an angle of 27° counterclockwise relative to the vertical axis of the display screen.

The second retardation film 49 is a transparent film of about 100 μm thick, formed by drawing polypropylene (PP), has a retardation value of 0.175 μm at a wavelength of 550 nm, and is disposed such that the retardation axis thereof is in a direction oriented at an angle of 80° counterclockwise relative to the horizontal axis of the display screen.

The polarizer 45 is bonded to the visible side of the upper substrate 21 of the touch panel 3. The polarizer 45 is the same as that used in the first embodiment, and is disposed such that the absorption axis thereof is in a direction oriented at an angle of 11° counterclockwise relative to the horizontal axis of the display screen.

With such a constitution as described above, the maximum flexibility of the upper substrate 21 can be ensured as a result of reduction in the number of constituent members disposed on the visible side of the upper substrate 21 of the touch panel 3, thereby enhancing sensitivity of the touch panel 3. Furthermore, the present embodiment is constructed so as not to allow an interface between media each having a largely different refractive index to exist between the polarizer 45 disposed on the upper substrate 21 and the first substrate 1 of the liquid crystal display panel 4 due to the presence of a filling medium 41, the double-sided adhesive layer 44, and so forth, so that display quality of the liquid crystal display panel can be improved as with the case of the first embodiment.

Fifth Embodiment: FIGS. 13 to 16

Next, a liquid crystal display device with an input panel attached thereto according to a fifth embodiment of a liquid crystal display device of the invention is described with reference to FIGS. 13 to 16.

Figure 13:
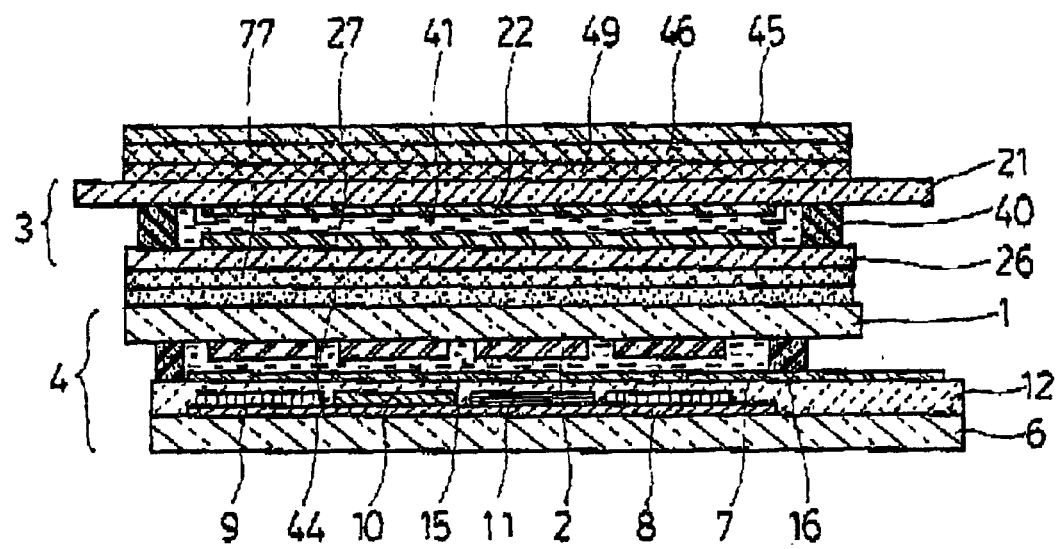
FIG. 13 is a sectional view similar to FIG. 4, showing the constitution of a liquid crystal display device with an input panel attached thereto according to a fifth embodiment of the invention.
Figure 14:
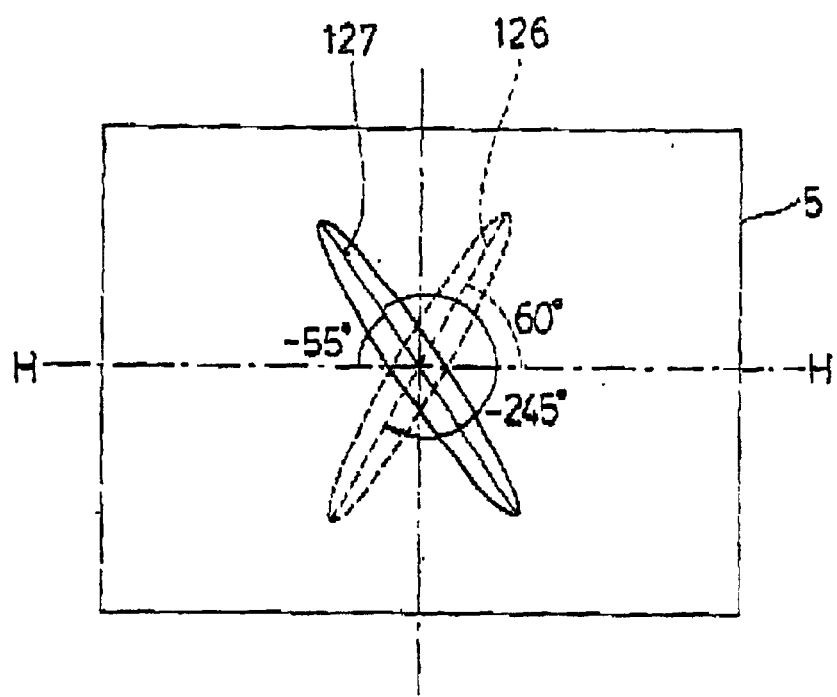
FIG. 14 is a view showing alignment directions of molecules of a twisted retardation film provided in the liquid crystal display device described above.
Figure 15:
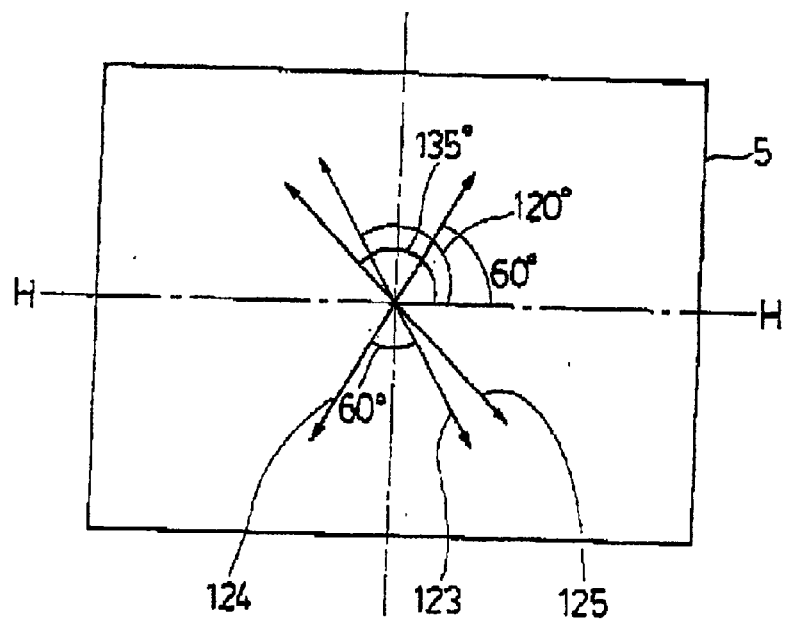
FIG. 15 is a view showing disposition directions of a first polarizer, a first retardation film, and a second retardation film, provided in the liquid crystal display device described above.
Figure 16:
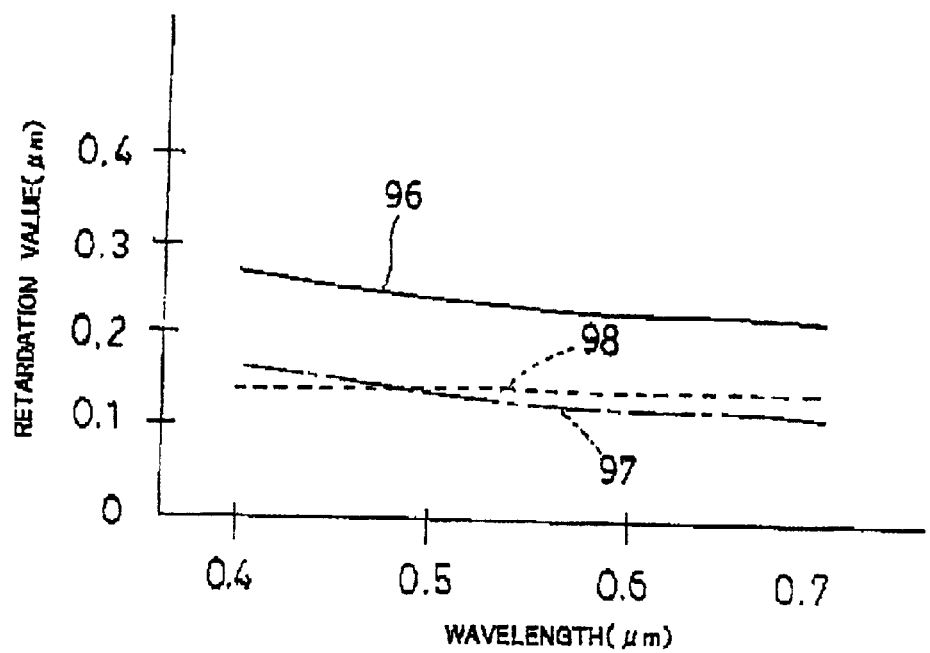
FIG. 16 is a graph showing wavelength dependency of respective retardation values of the first and second retardation films, and these films used in combination as a composite retardation film.

FIG. 13 is a sectional view similar to FIG. 4, showing the constitution of the liquid crystal display device, FIG. 14 is a view showing alignment directions of molecules of a twisted retardation film provided in the liquid crystal display device, FIG. 15 is a view showing disposition directions of a polarizer, a first retardation film, and a second retardation film, provided in the liquid crystal display device, and FIG. 16 is a graph showing wavelength dependency of respective retardation values of the first and second retardation films, and both these films used in combination as a composite retardation film.

In FIG. 13, parts corresponding to those of the first embodiment are denoted by like reference numerals, and description thereof is omitted or simplified. Further, parts other than those shown in FIG. 13 are the same as those of the liquid crystal display device with the input panel attached thereto according to the first embodiment, and description thereof is also omitted.

The present embodiment is characterized by the construction thereof, wherein unnecessary reflection of light from a viewer's side is prevented by installing a quarter-wave film and a half-wave film between a polarizer 45 disposed on the viewer's side of a touch panel 3 and the touch panel 3.

A liquid crystal display panel 4 of the liquid crystal display device shown in FIG. 13 is the same as the liquid crystal display panel 4 of the first embodiment, and description thereof is therefore omitted.

On the visible side of a first substrate 1 of the liquid crystal display panel 4, the same double-sided adhesive layer 44 as described in the first embodiment is disposed, and on the visible side of the double-sided adhesive layer 44, a twisted retardation film (inter-panel retardation film) 77 is laminated thereto. The twisted retardation film 77 and a lower substrate 26 of the touch panel 3 which is an input panel are bonded together with an adhesive. The touch panel 3 as well is the same as described in the first embodiment, and description thereof is therefore omitted.

As shown in FIG. 14, with the twisted retardation film 77, molecules thereof on the side of the first substrate 1 (on the underside) are aligned in a lower molecular alignment direction 126 oriented at an angle of 60° counterclockwise relative to the horizontal axis H—H of the display screen 5, and molecules thereof on the upper side are aligned in an upper molecular alignment direction 127 oriented at an angle of 235° clockwise (at an angle of 55° from the 9 o'clock direction towards the 12 o'clock direction) relative to the horizontal axis H—H as described above, so that the molecules on the underside are twisted through 245° clockwise from the molecules on the upper side. In FIG. 14, an angle of clockwise rotation is designated by the minus sign.

With the present embodiment, a liquid crystalline polymer film with a twist condition fixed at room temperature is used for the twisted retardation film 77, however, with the use of a temperature compensatory twisted retardation film wherein parts of liquid crystal molecules are simply bonded to chain polymer molecules, and a Δnd (n: refractive index, d: thickness of a liquid crystalline polymer) value thereof indicating birefringent tendency varies depending on temperature, brightness and contrast are improved at high and low temperatures, thereby ensuring more excellent display quality.

On the visible side of an upper substrate 21 of the touch panel 3, there are disposed a second retardation film 49, a first retardation film 46 and a polarizer 45 in that order from the side of the upper substrate 21 by laminating one on top of the other.

For the second retardation film 49, use is made of a transparent film of 70 µm thick formed by drawing polycarbonate (PC), serving as a quarter-wave film having a retardation value of 0.136 µm at a wavelength of 0.55 µm. Further, for the first retardation film 46, use is made of a transparent film of 70 µm thick formed by drawing polycarbonate (PC), serving as a half-wave film having a retardation value of 0.27 µm at a wavelength of 0.55 µm.

As shown in FIG. 15, the second retardation film 49 is disposed such that the retardation axis thereof is oriented in a retardation axis direction 124 rotated through 60° counterclockwise relative to the horizontal axis H—H of the display screen 5, and the first retardation film 46 is disposed such that the retardation axis thereof is oriented in a retardation axis direction 123 rotated through 120° counterclockwise relative to the horizontal axis H—H as described above. Accordingly, an intersection angle formed by respective retardation axes of the first retardation film 46 and the second retardation film 49 is 60°.

As to the case of laminating the first retardation film 46 to the second retardation film 49 as described above and using the same as the composite retardation film, the characteristics thereof are described hereinafter with reference to FIG. 16.

The retardation value of the quarter-wave film used as the second retardation film 49 has wavelength dependency increasing on the side of shorter wavelengths and decreasing on the side of longer wavelengths as indicated by a chain line 97 in FIG. 16. The retardation value of the half-wave film used as the first retardation film 46 also shows wavelength dependency similar to that for the quarter-wave film as indicated by a solid line 96 in the figure. This is because both the quarter-wave film and the half-wave film are normally formed of the same material.

However, by laminating the first retardation film 46 to the second retardation film 49 as described above, the retardation value at a wavelength of 0.55 µm becomes equivalent to the difference between a half-wavelength and a quarter-wavelength, that is, a quarter-wavelength, and further, the first and second retardation films can be used as a quarter-wave film having hardly any wavelength dependency in all wavelength regions in application as indicated by a broken line 98 in the figure.

With the present embodiment, there are provided conditions where there hardly exists wavelength dependency by virtue of the characteristics of a liquid crystal layer 15 and the twisted retardation film 77, however, by the agency of the first retardation film 46 and second retardation film 49, it is possible to attain wavelength dependency most favorable to the characteristics of the liquid crystal layer 15. Accordingly, by installing the twisted retardation film therein and using the same in a composite way, temperature dependency and viewing-angle dependency can also be improved.

The polarizer 45 disposed on the visible side of the first retardation film 46 is the same as that described in the first embodiment, and as shown in FIG. 15, it is disposed such that the absorption axis thereof is in an absorption axis direction 125 oriented at an angle of 135° counterclockwise relative to the horizontal axis H—H.

With such a constitution as described above, light reflected from the constituent members of the touch panel 3 or from interfaces between the respective constituent members can be prevented from going out to the viewer's side by virtue of the polarizer 45, the first retardation film 46, and the second retardation film 49, so that display with high chroma and in excellent contrast can be effected.

More specifically, by rendering the difference in retardation value between the first retardation film 46 and the second retardation film 49 substantially equivalent to a quarter-wavelength, linearly polarized light passing through the transmission axis of the polarizer 45 disposed on the visible side is turned into, for example, a right-hand twisted circularly polarized light upon passing through the first retardation film 46 and the second retardation film 49, and falls on the touch panel 3. The right-hand twisted circularly polarized light is turned into a left-hand twisted circularly polarized light when reflected from the constituent members of the touch panel 3 or from the interfaces therebetween. The left-hand twisted circularly polarized light is turned into linearly polarized light with the direction of polarization rotated through 90° from the initial direction upon passing through the first retardation film 46 and the second retardation film 49 again. Since the linearly polarized light falls on the absorption axis of the polarizer 45, and is absorbed thereby, so that the same does not go out to the viewer's side. Accordingly, reflection from the touch panel 3, already reduced by a filling medium 41, can be further reduced, and visibility of display by the liquid crystal display panel, particularly, contrast can be further improved.

Further, as a result of causing the quarter-wave film to function as the composite retardation film as described in the foregoing, there exists hardly any wavelength dependency of retardation, so that coloring of display can be reduced, and display with high chroma can be effected.

Figure 17:
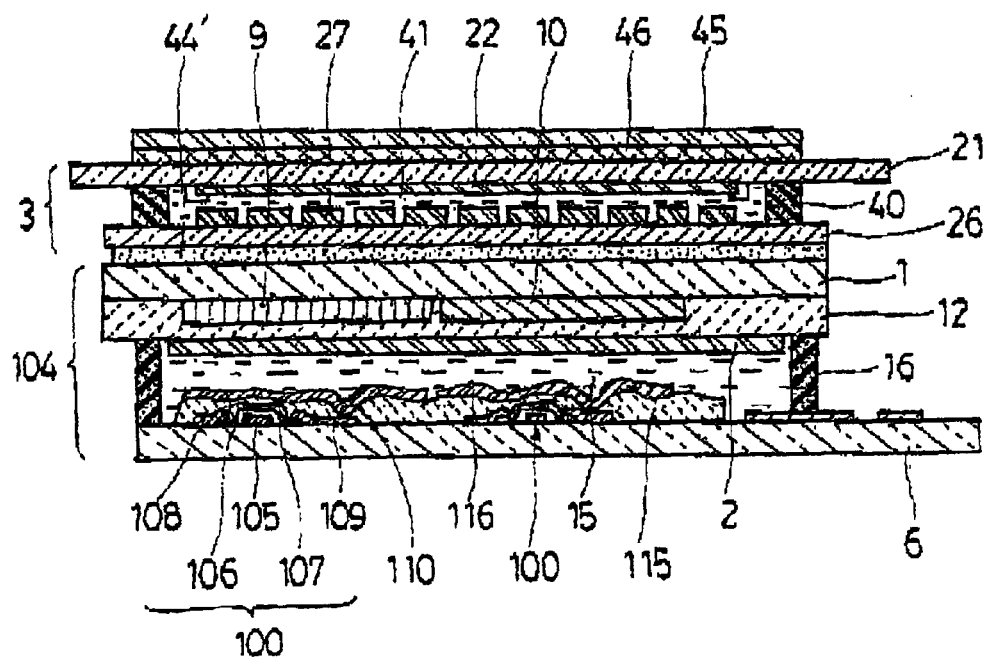
FIG. 17 is a sectional view similar to FIG. 4, showing the constitution of a liquid crystal display device with an input panel attached thereto according to a sixth embodiment of a liquid crystal display device of the invention.

Sixth Embodiment: FIG. 17

Next, a liquid crystal display device with an input panel attached thereto according to a sixth embodiment of a liquid crystal display device of the invention is described with reference to FIG. 17.

FIG. 17 is a sectional view similar to FIG. 4, showing the constitution of the liquid crystal display device. In FIG. 17, parts corresponding to those of the first embodiment are denoted by like reference numerals, and description thereof is omitted or simplified. Further, parts other than those shown in FIG. 17 are the same as those of the liquid crystal display device with the input panel attached thereto according to the first embodiment, and description thereof is also omitted.

The present embodiment is characterized by adoption of an active-matrix type liquid crystal display panel provided with thin-film transistor (TFT) elements, each acting as a switching element, through the intermediary of which a liquid crystal layer is driven.

With a liquid crystal display panel 104 of the liquid crystal display device shown in FIG. 17, there are formed gate electrodes 105 made up of a tantalum film on the face of a second substrate 6 made up of a glass sheet of 0.7 mm thick, on the side of a liquid crystal layer 15, a gate insulation film 106 disposed on the respective gate electrodes 105, and a semiconductor layer 107 made up of an amorphous silicon (a-Si) film, disposed on the respective gate insulation films 106 and the second substrate 6. On top of the respective semiconductor layers 107 and the second substrate 6, there are disposed a source electrode 108 and a drain electrode 109, both made up of a chromium film, thereby making up a multitude of (only two units are shown in FIG. 17) thin-film transistor (TFT) elements 100.

The respective gate electrodes 105 are electrodes oriented in the x-axis direction of the liquid crystal display panel 104 while the respective source electrodes 108 are electrodes oriented in the y-axis direction thereof.

Further, on top of the respective TFT elements 100 and the second substrate 6, there is provided an uneven surface insulation film 115 with bumps and dips formed on the surface thereof, and there is provided an inter-layer insulation film hole 110 at spots of the uneven surface insulation film 115, above the respective drain electrodes 109.

The uneven surface insulation film 115 is made of a photosensitive acrylic resin, and the bumps and dips on the surface are formed by the steps of irradiating spots for the bumps with light, subsequently applying a photolithographic process for enhancing solubility and a development process, and a heat treatment for smoothing the bumps and dips. The respective inter-layer insulation film holes 110 are formed by completely dissolving parts of the photosensitive acrylic resin, above the respective drain electrodes 109, through irradiation thereof with ultraviolet light more intense than that used for the formation of the bumps and dips, and an exposure treatment for a long time, which are to be applied prior to the formation of the bumps and dips.

On top of the uneven surface insulation film 115, there are disposed reflective electrodes 116 electrically connected to the respective drain electrodes 109 through the respective inter-layer insulation film holes 110. Further, a doped semiconductor layer is provided between the respective semiconductor layer 107 and the respective source electrodes 108 or the drain electrodes 109, and a passivation film is provided on top of the respective TFT elements 100, however, illustration of these is omitted in the figure.

Meanwhile, on a first substrate 1, there are disposed red color filters 9, green color filters 10, blue color filters (not shown), and a protective planarization layer 12 for maintaining the characteristics of these color filters and applying planarization to the surfaces thereof, and substantially on the entire surface of the protective planarization layer 12, first electrode 2 made up of a transparent and electrically conductive film are disposed. Each of spots where the first electrode 2 is opposed to the reflective electrodes 116, respectively, defines the address of a pixel.

The first substrate 1 and the second substrate 6 are coupled together with a predetermined gap provided therebetween by a sealing member 16 made of epoxy resin, and the gap is filled with liquid crystal and closed with a closing member (not shown), thereby forming a liquid crystal layer 15. Thus, the liquid crystal display panel 104 is completed.

For the liquid crystal layer 15, there is adopted twisted namatic (TN) liquid crystal, of which liquid crystal molecules on the side of the first substrate 1 are aligned in a direction rotated through 112.5° clockwise relative to the horizontal axis of the display screen as described hereinbefore while liquid crystal molecules on the side of the second substrate 6 are aligned in a direction rotated through 67.5° clockwise relative to the horizontal axis described, so that the liquid crystal molecules are twisted through 45° counterclockwise from the first substrate 1 side to the second substrate 6 side. Such alignment is implemented with alignment layers (not shown).

With the liquid crystal display panel 104, display is effected by applying electric signals (voltages) to the liquid crystal layer 15 of the respective pixels via the respective TFT elements 100 serving as the switching elements.

Accordingly, it is possible to cause liquid crystal molecules to undergo a greater change in phase, and consequently, brighter display can be effected as compared with the case of employing supertwisted nematic (STN) liquid crystal. In addition, it is possible to reduce the number of retardation films to be used, deterioration in sensitivity of the touch panel, and the thickness of the liquid crystal display device.

On the upper surface of the first substrate 1 disposed on the visible side of the liquid crystal display panel 104, there is disposed a double-sided adhesive layer 44' made of an acrylic resin, which bonds the liquid crystal display device 104 to a lower substrate 26 of the touch panel 3 which is an input panel. The double-sided adhesive layer 44' has no optical diffusibility unlike the case of the first embodiment.

The touch panel 3 has the same constitution as described in the first embodiment, and description thereof is therefore omitted.

On the viewer's side of an upper substrate 21 of the touch panel 3, there are disposed a retardation film (first retardation film) 46 and a polarizer 45 in that order from the side of the touch panel 3 by laminating one on top of the other. The retardation film 46 is made up of a transparent film of 70 $\mu$m thick formed by drawing polycarbonate (PC), serving as a quarter-wave film having a retardation value of 0.137 $\mu$m at a wavelength of 0.55 $\mu$m. For the polarizer 45, use is made of an absorption type polarizer wherein one of the polarization axes is the transmission axis, and the other of the polarization axes, substantially orthogonal to the transmission axis, is the absorption axis. As with the first embodiment, by applying the anti-reflection treatment, anti-contamination treatment, hard coat treatment, and so forth, to the surface of the polarizer 45, it is possible to achieve improvement in display quality of the liquid crystal display device and durability of the touch panel.

In the case of increasing the number of the pixels for display in the liquid crystal display panel 104, the active matrix type liquid crystal display panel making use of the switching elements for driving the liquid crystal layer as in the present embodiment is effective. That is, if the active matrix type is adopted, a scope of selection for retardation films installed in the liquid crystal display device can be widened, a disposition angle as well as retardation value of retardation films and a reflector can be variously selected, and further, the liquid crystal layer of twisted alignment, parallel alignment, and so forth can be put to use, so that it becomes possible to make effective use of the constitution according to the present invention.

It goes without saying that a type of liquid crystal display panel using thin-film diode (TFD) elements as switching elements may be adopted, or the same active matrix type liquid crystal display panel as described in the present embodiment may be applied to the liquid crystal display device according to any of the first to fifth embodiments.

Further, the switching elements may be disposed on the side of the first substrate disposed on the visible side of the liquid crystal display panel 104, however, if switching elements and a reflector or a transflective reflector, connected with the switching elements, are disposed on the second substrate disposed on the side of the liquid crystal display panel 104 opposite from the visible side thereof as with case of the present embodiment, the color filters and the first electrode 2 are disposed on the first substrate, the first electrode 2 is formed to a relatively thin thickness, and constituent members disposed between the touch panel and the reflector or the transflective reflector are reduced in number, this will enable bright display to be effected.

Seventh Embodiment: FIGS. 18 to 21

Next, a liquid crystal display device with an input panel attached thereto according to a seventh embodiment of a liquid crystal display device of the invention is described with reference to FIGS. 18 to 21.

Figure 18:
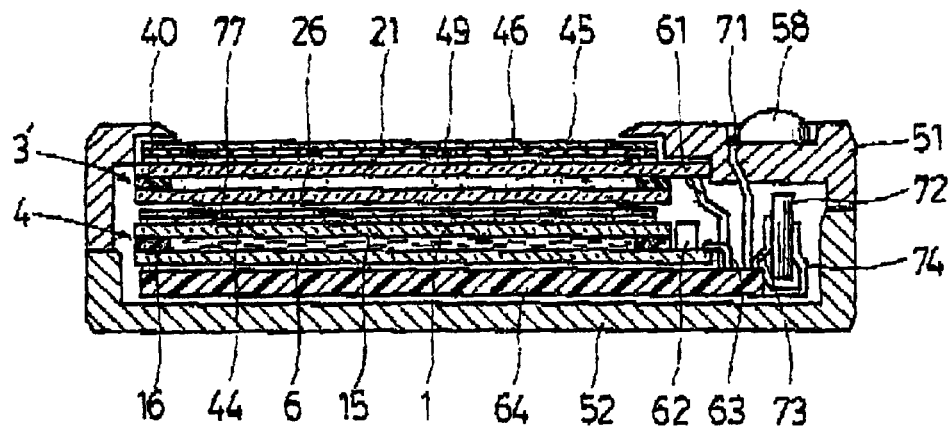
FIG. 18 is a sectional view similar to FIG. 3, showing the constitution of a portable information equipment incorporating a liquid crystal display device with an input panel attached thereto according to a seventh embodiment of a liquid crystal display device of the invention.
Figure 19:
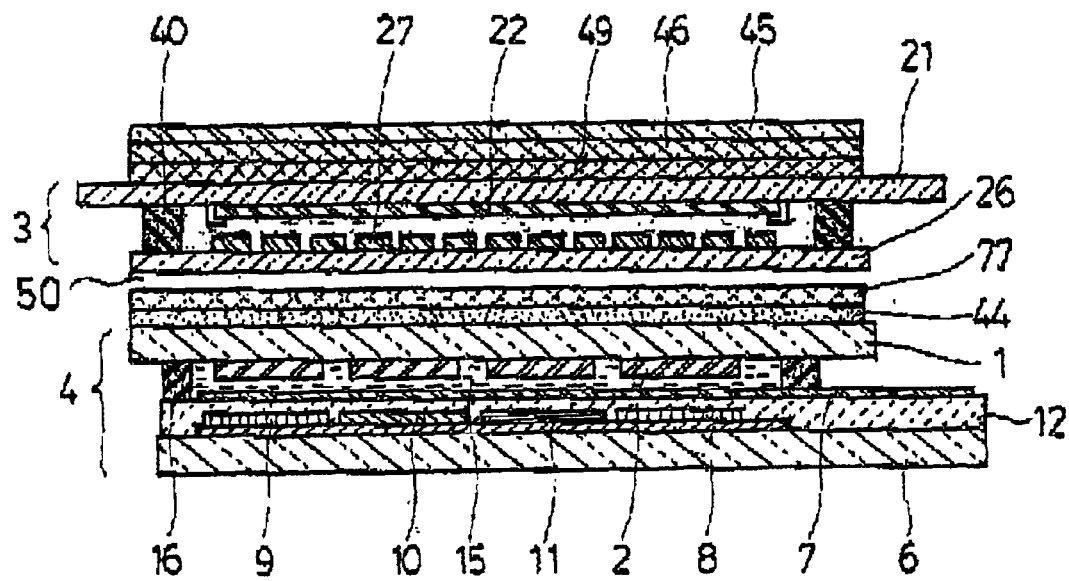
FIG. 19 is a partially enlarged sectional view similar to FIG. 4, showing a liquid crystal display panel and an input panel of the liquid crystal display device described above.

FIG. 18 is a sectional view similar to FIG. 3, showing a portable information equipment incorporating the liquid crystal display device with the input panel attached thereto, FIG. 19 is an enlarged sectional view similar to FIGS. 4 and 13, showing the liquid crystal display panel with the input panel attached thereto for use in the portable information equipment. In FIGS. 18 and 19, parts corresponding to those of the first and fifth embodiments are denoted by like reference numerals.

The present embodiment is characterized in that a vacant space is provided between a touch panel and a liquid crystal display panel, and the touch panel is not provided with a filling medium. Otherwise, the present embodiment is substantially the same as the fifth embodiment, and description thereof other than points of difference is therefore omitted or simplified.

The constitution of the portable information equipment shown in FIG. 18 is substantially the same as that of the portable information equipment shown in FIG. 3 with reference to the first embodiment, and differs therefrom only in that the touch panel 3' of the former is somewhat different from the touch panel 3 in FIG. 3, and the vacant space is provided between the touch panel 3' and the liquid crystal display panel 4.

The enlarged and detailed constitution of the touch panel 3' and the liquid crystal display panel 4 is shown in FIG. 19. Since the constitution of the liquid crystal display panel 4 is the same as that of the liquid crystal display panel 4 according to the first and fifth embodiments shown in FIGS. 4 and 13 description thereof is omitted.

On the visible side of a first substrate 1 of the liquid crystal display panel 4, there is disposed a double-sided adhesive layer 44 which is the same as that described in the fifth embodiment, and on the visible side thereof, a twisted retardation film (inter-panel retardation film) 77 is disposed by bonding thereto.

As shown in FIG. 14, with the twisted retardation film 77, molecules thereof on the side of the first substrate 1 (on the underside) are aligned in a lower molecular alignment direction 126 oriented at an angle of 60° counterclockwise relative to the horizontal axis H—H of the display screen 5, and molecules thereof on the upper side are aligned in an upper molecular alignment direction 127 oriented at an angle of 55° clockwise relative to the horizontal axis H—H as described above, so that the molecules on the underside of the twisted retardation film 77 are twisted through 245° clockwise from the molecules on the upper side.

For the twisted retardation film 77, use is made of a film obtained by applying a liquid crystalline polymer having a twist structure to a triacetylcellulose (TAC) film or a polyethylene terephthalate (PET) film to which an alignment treatment has already been applied, adjusting a twist angle thereof by turning the same into a liquid crystal state at a high temperature on the order of 130° C., and subsequently, fixing a twist condition thereof by rapidly cooling the same to room temperature.

Otherwise, use may be made of a right-handed twisted retardation film having a twist angle of −177° and Δnd value of indicating birefringent tendency 780 nanometers (nm) made up of a film formed by applying a liquid crystalline polymer to a film separately prepared with an alignment treatment applied thereto, fixing a twist condition thereof, and subsequently, transferring the liquid crystalline polymer to a TAC film.

As shown in FIG. 19, the vacant space 50, 0.2 mm in width, is provided on the visible side of the twisted retardation film 77, and the touch panel 3' is disposed such that a lower substrate 26 thereof is opposed to the twisted retardation film 77 with the vacant space 50 interposed therebetween.

The touch panel 3' is substantially the same in constitution as the touch panel 3 according to the first embodiment, shown in FIG. 4, but differs therefrom in that a touch panel sealing member 40 is provided with a vent (not shown) for ventilation with outside, a filling medium 41 is not provided, dome-like spacers 39 as shown in FIG. 7 are 10 to 13 μm in diameter, and an upper substrate 21 is provided with positioning marks.

On the viewer's side of the upper substrate 21 of the touch panel 3', there are disposed a second retardation film 49, a first retardation film 46, and a polarizer 45 in that order from the side of the upper substrate 21 by bonding to each other with an adhesive layer. Disposition angles and functions of these retardation films and the polarizer are the same as those for the fifth embodiment, and by the agency thereof, light reflected from constituent members of the touch panel 3' or from interfaces between the respective constituent members is caused to fall on the absorption axis of the polarizer 45, thereby preventing the light from going out to the viewer's side.

The external shape of the polarizer 45 is preferably rendered equivalent in size to or smaller than that of the first retardation film 46, the second retardation film 49, and the upper substrate 21. This is because otherwise the external shape of the touch panel 3' is unstabilized, and positioning accuracy can not be maintained at the time of combining the touch panel 3' with the liquid crystal display panel 4. Further, if the polarizer 45 is extended as far as the outermost periphery of the touch panel 3', this will cause both the touch panel sealing member 40 composing the touch panel 3' and a region outside of the touch panel sealing member 40 to be covered with the polarizer 45, so that the upper substrate 21 is rendered harder because the polarizer is harder than the retardation films, thereby deteriorating input sensitivity. Accordingly, the external shape of the polarizer 45 is rendered smaller than that of other constituent members.

The positioning marks (not shown) of the touch panel 3' are recesses provided at two spots diagonally located on the upper substrate 21 for aligning the absorption axis of the polarizer 45 disposed on top of the touch panel 3' with the alignment direction of liquid crystal molecules of a liquid crystal layer 15 since the vacant space 50 is provided between the touch panel 3' and the liquid crystal display panel 4. These recesses are fitted onto respective juts of a module frame holding the liquid crystal display panel 4 and the touch panel 3' together, thereby preventing deviation in positioning.

When bonding the second retardation film 49, the first retardation film 46, and the polarizer 45 onto the touch panel 3', the positioning marks of the touch panel 3', in the shape of recesses, are effective in locating the positions of the respective members described above. The recesses can be formed with ease when press working is made on a film substrate, and a multitude of upper substrates in close proximity to each other can be worked because the recesses on an upper substrate are not prone to interference with those on another upper substrate adjacent to the upper substrate as compared with the case of juts even when fabricating the upper substrates by working the multitude of the upper substrates in close proximity to each other. Nevertheless, even if positioning marks in the shape of juts are provided, alignment can be implemented with ease as with the case of the recesses.

Figure 20:
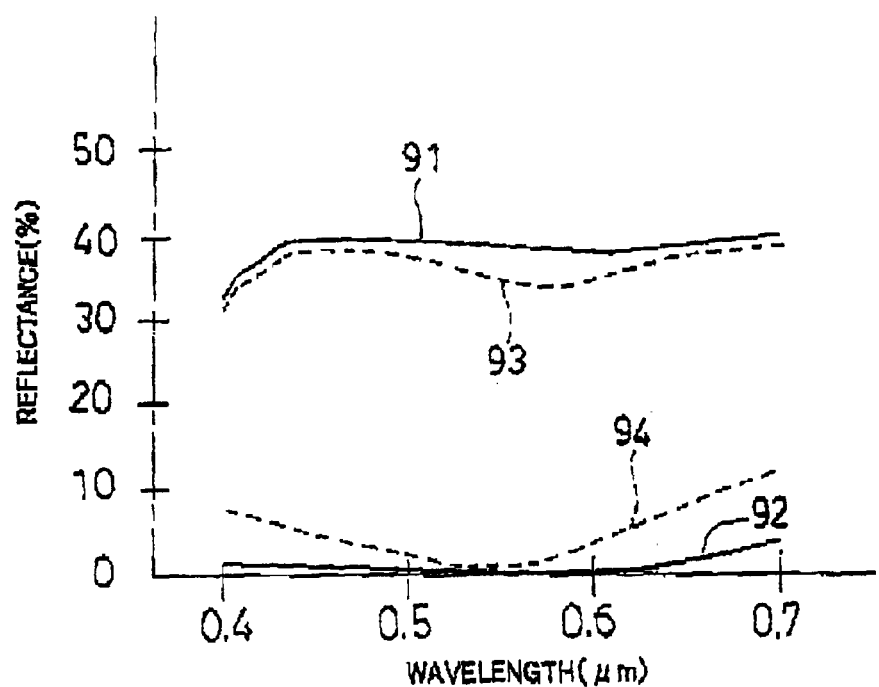
FIG. 20 is a graph showing wavelength dependency of reflectance at the time of bright display as well as dark display in the case of effecting reflective display with the use of the liquid crystal display device according to the invention shown in FIG. 19, and a conventional liquid crystal display device employing only one layer of a quarter-wave film as a retardation film disposed on the visible side of a touch panel, respectively.

Now, referring to FIG. 20, wavelength dependency of reflectance at the time of bright display as well as dark display in the case of effecting reflective display with the use of the liquid crystal display device according to the seventh embodiment, and a conventional liquid crystal display device employing only one layer of a quarter-wave film as a retardation film disposed on the visible side of a touch panel, respectively. Further, referring to FIG. 21, there are hereinafter described results of evaluation made on brightness and contrast of display quality in the cases of another conventional liquid crystal display device without a retardation film disposed on the visible side of a touch panel in addition to the aforementioned liquid crystal display devices.

In FIG. 20, the wavelength dependencies of reflectance at the time of bright display and dark display by the liquid crystal display device according to the present embodiment are indicated by solid lines 91 and 92, respectively, while the wavelength dependencies of reflectance at the time of bright display and dark display by the conventional liquid crystal display device are indicated by broken lines 93 and 94, respectively.

As shown in FIG. 20, with the conventional liquid crystal display device, the retardation value of the quarter-wave film has wavelength dependency, and is unable to compensate for the wavelength dependency of a liquid crystal display panel, so that reflectance in dark display is found increasing significantly on both the short wave side and the long wave side in comparison with the liquid crystal display device according to the present embodiment. If reflectance in dark display is as high as that shown in the figure, this will considerably deteriorate contrast, resulting in black display with coloring.

Meanwhile, in bright display with the conventional liquid crystal display device, reflectance in a wavelength region corresponding to green color is found lower, and consequently, brightness deteriorates, resulting in white display with coloring. In contrast, with the liquid crystal display device according to the present embodiment, no wavelength dependency is observed, and high reflectance is indicated in bright display as a whole while very low reflectance is indicated in dark display.

Thus, if the wavelength dependency of the retardation value of the liquid crystal display panel is reduced by providing a plurality of retardation films between the polarizer and the touch panel, it becomes possible to realize excellent contrast and effect black display and white display with no coloring, and in particular, in the case of color filters being provided, it becomes possible to effect display high in chroma.

Figure 21:
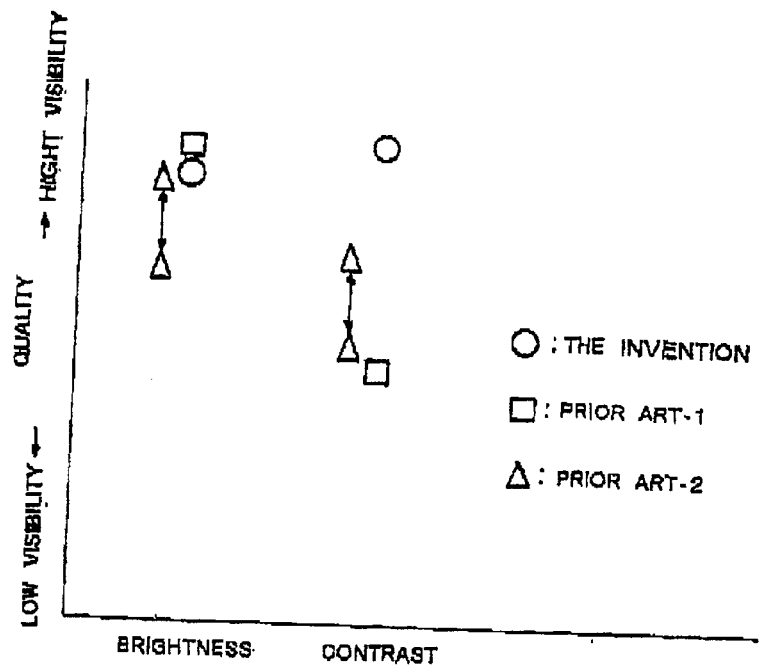
FIG. 21 is a graph showing results of evaluation made on brightness and contrast ratio in the case of those liquid crystal display devices described above, and another conventional liquid crystal display device without a retardation film disposed on the visible side of a touch panel, respectively.

In FIG. 21, the characteristic of the liquid crystal display device according to the present embodiment is denoted by a circle sign, that of the conventional liquid crystal display device provided with no retardation film a delta sign, and that of the conventional liquid crystal display device provided with only one layer of the quarter-wave film a square sign.

As shown in the figure, as for brightness with the conventional liquid crystal display device provided with no retardation film, because there is large reflection from the touch panel, which is added to a quantity of reflected light in reflective display, display is recognized seemingly as bright while with the constitution of the present embodiment, because reflected light from the touch panel 3' is reduced, brightness as a whole slightly drops although there is an increase in portions of light, reflected from the liquid crystal display panel 4.

Further, with the conventional liquid crystal display device employing only one layer of the quarter-wave film, since the retardation value of the quarter-wave film has wavelength dependency as previously described, coloring occurs to display, and variation in brightness occurs even if disposition relationship between a polarizer and the quarter-wave film is optimized.

As for contrast with the conventional liquid crystal display device provided with no retardation film, because there is large reflection from the touch panel as previously described, which is added to reflected light as a whole from a liquid crystal display panel regardless of display contents, contrast deteriorates considerably. That is, reflection from the touch panel ends up acting as a noise component against display by the liquid crystal display panel.

On the other hand, with the liquid crystal display device according to the present embodiment, since reflection from the touch panel 3' can be reduced, contrast is improved. In addition, it is possible to reduce color shift and blurring of images due to interference at interfaces.

With the conventional liquid crystal display device employing only one layer of the quarter-wave film, reflection from the touch panel can be reduced by the agency of the polarizer and the quarter-wave film, however, because it is impossible to compensate for the wavelength dependency of the retardation value of a liquid crystal layer in dark display throughout the visible light range, reflection increases depending on the wavelength of light, and contrast deteriorates. Accordingly, such an excellent characteristic as that of the liquid crystal display device according to the present embodiment can not be obtained.

As described hereinbefore, with the constitution according to the seventh embodiment of the invention, even if no filling medium is provided, and the vacant space is provided between the touch panel 3' and the liquid crystal display panel 4, reflection inside the touch panel 3' and reflection between the touch panel 3' and the liquid crystal display panel 4 can be prevented by disposing the second retardation film 49, the first retardation film 46 and the polarizer 45 on the visible side of the touch panel 3'. In addition, because it is possible to prevent deterioration of transmittance due to reflection, coloring, absorption of light, and so forth by reducing the number of the constituent members, display quality of the liquid crystal display device effecting reflective display, particularly contrast and chroma, can be improved.

Further, in contrast with a conventional construction wherein one sheet of the quarter-wave film and the polarizer are disposed on the visible side of the touch panel, by rendering the retardation value at a wavelength of 0.55 $\mu$m of the first retardation film 46 and the second retardation film 49, used in combination as the composite retardation film, substantially equivalent to a quarter wavelength, the wavelength dependency of the retardation value can be optimized to the retardation value of the liquid crystal layer.

More specifically, it is possible to reduce reflectance (transmittance) throughout the visible light range at the time of dark display, and to increase reflectance (transmittance) throughout the visible light range at the time of bright display. Further, it also becomes possible to reduce reflection from the touch panel 3' and so forth in a wide wavelength range of the visible light. Such an effect as described is effective, particularly, with a color reflective liquid crystal display device employing color filters, and a liquid crystal display device provided with STN liquid crystals, effecting display by taking advantage of the retardation value of a liquid crystal layer.

Further, since reflected light from the touch panel 3' or from between the touch panel 3' and the liquid crystal display panel 4 is not sent out to the visible side by the agency of the polarizer 45, the first retardation film 46, and the second retardation film 49, the vacant space 50 can be provided between the touch panel 3' and the liquid crystal display panel 4. Even if the touch panel 3' undergoes deflection by pressure applied thereto when a user provides an input thereto, it is possible by virtue of the effect of the vacant space 50 to prevent deflection from occurring to the first substrate 1 of the liquid crystal display panel 4 due to pressure applied thereto, and to prevent changes from occurring to the alignment direction and thickness of the liquid crystal layer 15, and the constitution of the present embodiment is therefore effective for improvement of the display quality of the liquid crystal display panel 4.

With the present embodiment, an example is described wherein 240° twisted STN liquid crystal is used in the liquid crystal layer 15, and an intersection angle formed by the respective retardation axes of the first retardation film 46 and the second retardation film 49 is 60°, however, the effect of the present embodiment can be achieved if the liquid crystal layer 15 has a twist angle in a range of 200 to 260°, and an intersection angle formed by the respective retardation axes of the retardation films falls in a range of 60 to 90°. As to the retardation values of the retardation films, substantially equivalent to a quarter wavelength and a half wavelength respectively will suffice. With such a configuration as described above, the retardation value of the first retardation film 46 and the second retardation film 49, used in combination, at a wavelength of 0.55 $\mu$m becomes equivalent to a quarter wavelength or somewhat greater, thereby improving contrast in display of the liquid crystal display panel 4 by preventing reflection of light from the touch panel 3', and so forth.

Further, by varying the wavelength dependency of the retardation value of the first retardation film 46 and that of the second retardation film 49, reflected color slightly occurring to the touch panel 3' and display color of the liquid crystal display panel 4 can be changed with ease.

Although it is possible to obtain a retardation value equivalent to a quarter wavelength by providing a plurality of retardation films laminated besides the first retardation film 46 and that of the second retardation film 49, pressure necessary for causing upper electrodes of the touch panel to come in contact with lower electrodes will rise as a result of the plurality of the retardation films being installed, thereby lowering sensitivity of the liquid crystal display device. Accordingly, it is optimum in terms of the performance of the touch panel to obtain the retardation value equivalent to a quarter wavelength by providing two sheets of retardation films.

Furthermore, by disposing a retardation film between the lower substrate 26 of the touch panel 3' and the first substrate 1 of the liquid crystal display panel 4, display color and viewing angle characteristic of the liquid crystal display panel, particularly at the time of reflective display, can be improved. If a retardation film is disposed on the upper substrate 21 side of the touch panel 3' for improvement of the display quality of the liquid crystal display panel 4, this is not desirable from the viewpoint of preventing reflection because the retardation value will be largely deviated from a quarter wavelength. For this reason, a retardation film is preferably disposed between the lower substrate 26 and the first substrate 1. Further, if a twisted retardation film is adopted for the retardation film, this will enable the viewing angle characteristic and temperature dependency of the liquid crystal display panel to be improved.

Still further, since a reflector 8 is disposed on a second substrate 6 of the liquid crystal display panel 4, on the side of the liquid crystal layer 15, it is difficult to install two sheets of polarizers between a viewer and the reflector 8 with the liquid crystal layer 15 sandwiched therebetween, so that display needs to be effected by the so-called single-polarizer method using one sheet of polarizer. Accordingly, contrast is to be obtained by the effect of variation in the retardation value of the liquid crystal layer 15. As a result, in the case of disposing the reflector 8 on the second substrate 6, it becomes important to dispose the first retardation film 46 and the second retardation film 49 on the touch panel 3'.

If a substrate having a substantially even retardation value within its plane is adopted for the upper substrate and the lower substrate, making up the touch panel, it is possible to reduce display unevenness of the liquid crystal display panel. Use of optically isotropic substrates having a retardation value nearly at 0 also enables display without unevenness to be effected. Furthermore, in such a case, the display quality will be no longer dependent on the retardation value of substrates making up the touch panel, and consequently, deterioration in the temperature dependency and viewing angle dependency of the display quality due to the touch panel can be prevented.

Figure 22:
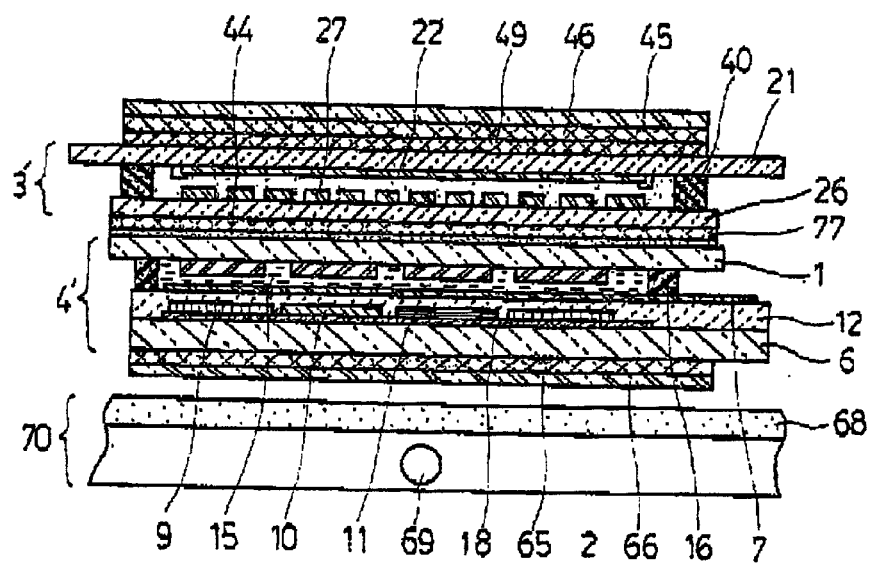
FIG. 22 is a sectional view similar to FIG. 4, showing the constitution of a liquid crystal display device with an input panel attached thereto according to a eighth embodiment of a liquid crystal display device of the invention.
Figure 23:
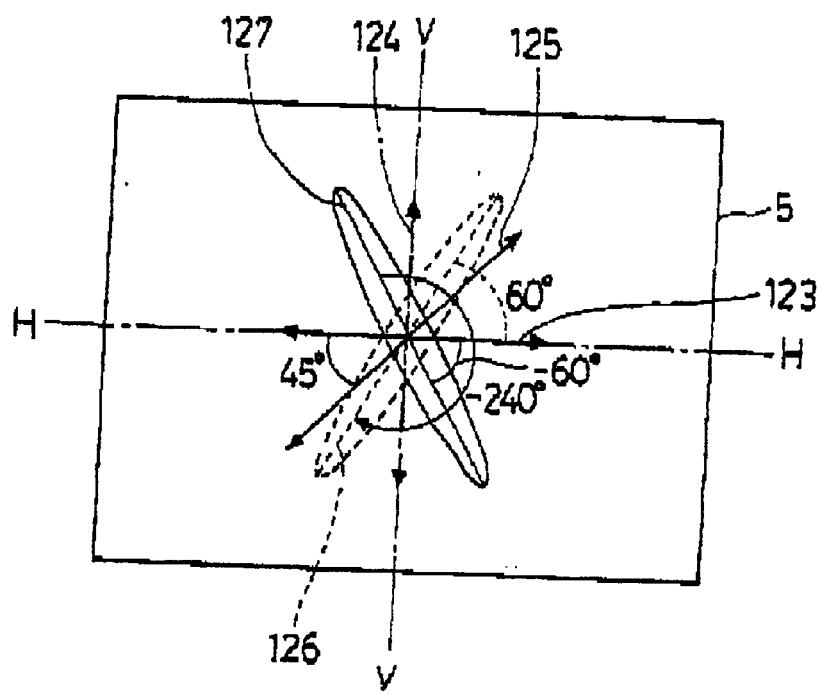
FIG. 23 is a view showing directions of the retardation axes of retardation films, a direction of the absorption axis of a polarizer, and alignment directions of molecules of a twisted retardation film, respectively disposed on a touch panel of the liquid crystal display device.
Figure 24:
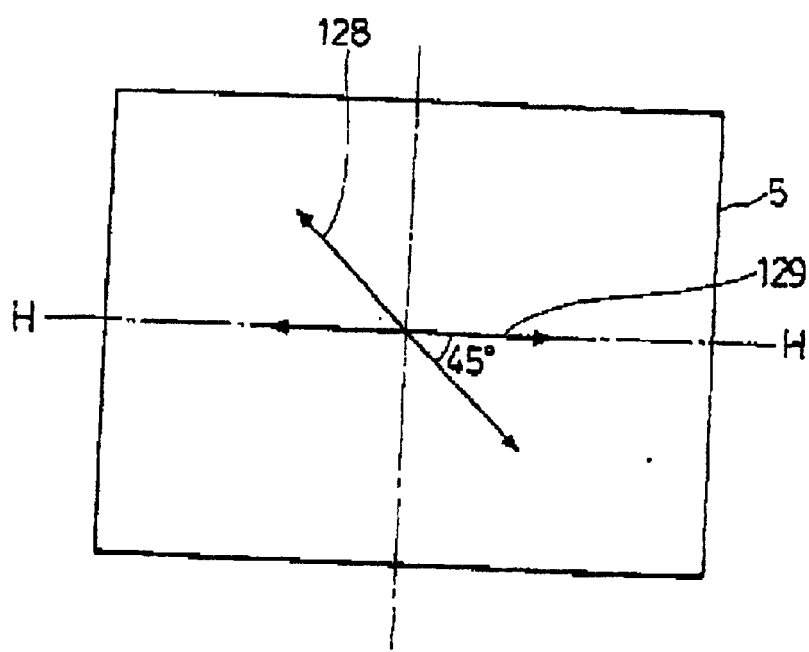
FIG. 24 is a view showing a direction of the retardation axis of a retardation film, and a direction of the absorption axis of a polarizer, respectively disposed on the side of a second substrate of a liquid crystal display panel of the liquid crystal display device.

Eighth Embodiment: FIGS. 22 to 24

Next, a liquid crystal display device with an input panel attached thereto according to an eighth embodiment of a liquid crystal display device of the invention is described with reference to FIGS. 22 to 24.

FIG. 22 is a sectional view similar to FIGS. 10 and 19, showing the constitution of the liquid crystal display device, FIG. 23 is a view showing directions of the retardation axes of retardation films, a direction of the absorption axis of a polarizer, and alignment directions of molecules of a twisted retardation film, disposed on a touch panel, and FIG. 24 is a view showing a direction of the retardation axis of a retardation film, and a direction of the absorption axis of a polarizer, disposed on the side of a second substrate of a liquid crystal display panel.

In these figures, parts corresponding to those of the second and seventh embodiments, shown in FIGS. 10 and 19, respectively, are denoted by like reference numerals, and description thereof is omitted or simplified. Further, parts other than those shown in FIGS. 22 to 24 are the same as those for the second and seventh embodiments, and description thereof is also omitted.

The present embodiment is characterized in that, in contrast to the liquid crystal display device according to the seventh embodiment, a reflector used in the liquid crystal display panel has optical transmissiveness, and a retardation film, a polarizer, an auxiliary light source are disposed on the side of the second substrate of the liquid crystal display panel, opposite from a liquid crystal layer, and the touch panel is bonded to the liquid crystal display panel. In these respects, however, the present embodiment is the same as the second embodiment shown in FIG. 10.

The liquid crystal display panel 4' of the liquid crystal display device shown in FIG. 22 is the same in constitution as the liquid crystal display panel 4' according to the second embodiment, shown in FIG. 10, and description thereof is therefore omitted.

On the visible side of a first substrate 1 of the liquid crystal display panel 4', there is disposed a double-sided adhesive layer 44 which is the same as that described in the seventh embodiment, and on the visible side thereof, a twisted retardation film (inter-panel retardation film) 77 is laminated thereto. The twisted retardation film 77 and a lower substrate 26 of the touch panel 3' serving as an input panel are bonded together with an adhesive. The touch panel 3' is also the same in constitution as that described in the seventh embodiment, shown in FIG. 19, and description thereof is therefore omitted.

As shown in FIG. 23, with the twisted retardation film 77, molecules thereof on the side of the first substrate 1 (on the underside) are aligned in a lower molecular alignment direction 126 oriented at an angle of 60° counterclockwise relative to the horizontal axis H—H of a display screen 5, and molecules on the upper side thereof are aligned in an upper molecular alignment direction 127 oriented at an angle of 60° clockwise relative to the horizontal axis H—H as described above, so that liquid crystalline polymer molecules are twisted through 240° clockwise from the molecules on the upper side towards the molecules on the underside. In FIG. 23, an angle of clockwise rotation is denoted by the minus sign.

For the twisted retardation film 77, use is made of a film obtained by applying a liquid crystalline polymer having a twist structure to a triacetylcellulose (TAC) film or a polyethylene terephthalate (PET) film to which an alignment treatment has already been applied, adjusting a twist angle thereof by turning the same into a liquid crystal state at a high temperature on the order of 130° C., and subsequently, fixing a twisted condition thereof by rapidly cooling the same to room temperature. However, use may be made of a right-hand twisted retardation film having a twist angle of −177° and Δnd value indicating birefringent tendency at 780 nanometers (nm), made up of a film formed by applying a liquid crystalline polymer to a film separately prepared with an alignment treatment applied thereto, fixing a twisted condition thereof, and subsequently, transferring the liquid crystalline polymer to a TAC film.

On the viewer's side of an upper substrate 21 of the touch panel 3', there are disposed a second retardation film 49, a first retardation film 46, and a polarizer (first polarizer) 45 in that order by laminating one on top of the other from the side of the upper substrate 21. These retardation films and the polarizer are the same as those used in the seventh embodiment, however, disposition angles thereof differ from those for the seventh embodiment. That is, as shown in FIG. 23, the second retardation film 49 is disposed such that the retardation axis thereof is oriented in a retardation axis direction 124 which is the direction of the vertical axis V—V, and the first retardation film 46 is disposed such that the retardation axis thereof is oriented in a retardation axis direction 123 which is the direction of the horizontal axis H—H.

Accordingly, an intersection angle formed by respective retardation axes of the first retardation film 46 and the second retardation film 49 is 90°. The first polarizer 45 is disposed such that the absorption axis thereof is oriented in an absorption axis direction 125 rotated through 45° counterclockwise relative to the horizontal axis H—H.

With such a configuration as described above, light reflected from constituent members of the touch panel 3' or from interfaces between the respective constituent members is caused to fall on the absorption axis of the first polarizer 45, thereby preventing the light from going out to the viewer's side as with the case of the seventh embodiment.

On the face of a second substrate 6 of the liquid crystal display panel 4', on the side thereof, opposite from a liquid crystal layer 15 (opposite from the visible side), there are disposed a third retardation film 65, a second polarizer 66, and an auxiliary light source 70 in that order from the side of the second substrate 6. Among them, the second polarizer 66 and the auxiliary light source 70 are the same as those in the second embodiment. Further, the third retardation film 65 is the same as the second retardation film 49 in the second embodiment.

As shown in FIG. 24, the third retardation film 65 is disposed such that the retardation axis thereof is oriented in a retardation axis direction 129 which is the direction of the horizontal axis H—H of a display screen 5. The second polarizer 66 is disposed such that the absorption axis thereof is oriented in an absorption axis direction 128 rotated through 45° clockwise relative to the horizontal axis H—H described above, the absorption axis direction 128 crossing the absorption axis direction 125 of the first polarizer 45 substantially at right angles.

With the aforementioned constitution, when the surroundings where the liquid crystal display device is used are bright, display in a reflective display mode making use of an external light source can be effected. In such a state, the same effect as described in the seventh embodiment can be obtained.

Meanwhile, when the surroundings where the liquid crystal display device is used are dark, display in a transmissive display mode can be effected by lighting up an auxiliary light source 70, thereby causing outgoing light therefrom to enter the device through the second polarizer 66 so as to be able to take advantage of the agency of the first polarizer 45 and optical changes occurring the liquid crystal layer 15 as a result of voltage applied thereto.

Accordingly, the liquid crystal display device according to the present embodiment can be used in a variety of environments, and has the same advantageous effects as those of the liquid crystal display device according to the second embodiment such as an improvement of contrast and chroma, and so forth.

With the present embodiment, an example is described wherein only one sheet of retardation film is disposed on the side of the second substrate 6 of the liquid crystal display panel 4', opposite from the visible side thereof, however, by disposing two sheets of retardation films (a third retardation film and a fourth retardation film) as with those on the visible side of the touch panel 3', and rendering the difference in the retardation value between the third retardation film and the fourth retardation film substantially equivalent to a quarter wavelength, it is possible to effect display excellent in contrast and color even in the case of transmissive display as with the case of reflective display. In this case, if a quarter-wave film is adopted for the third retardation film and a half-wave film for the fourth retardation film, this will enable members to be used for the first retardation film and the second retardation film in common with the third and fourth retardation films, respectively, so that it becomes possible to make effective use of the members.

Figure 25:
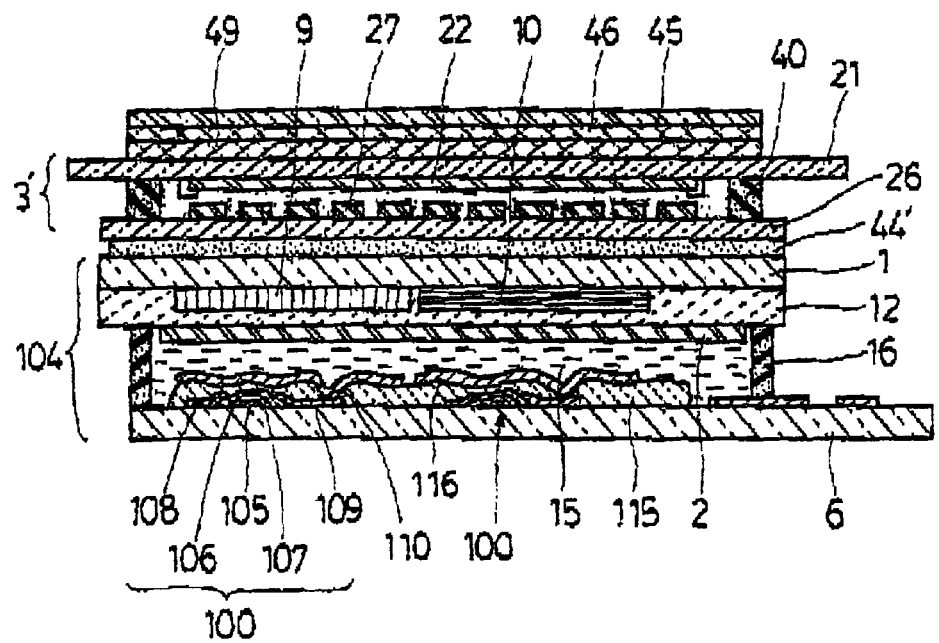
FIG. 25 is a sectional view similar to FIG. 17, showing the constitution of a liquid crystal display device with an input panel attached thereto according to a ninth embodiment of a liquid crystal display device of the invention.
Figure 26:
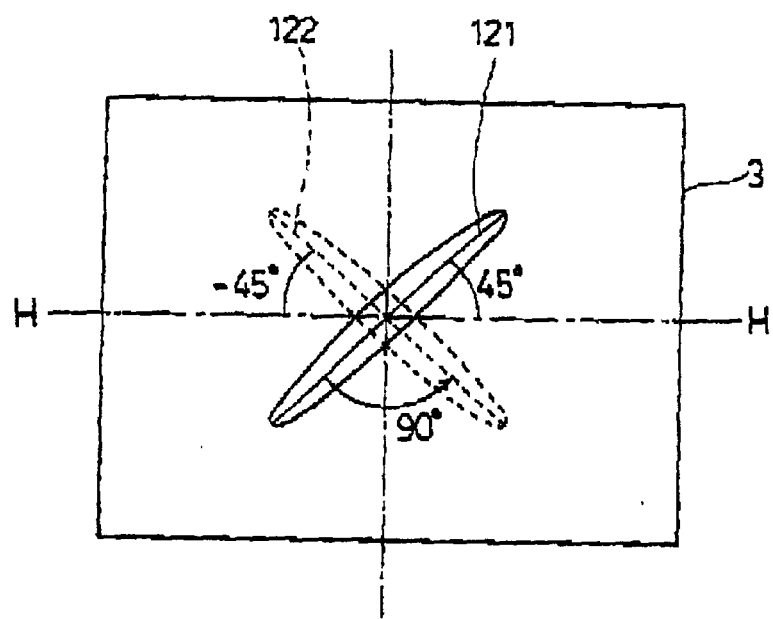
FIG. 26 is a view showing alignment directions of liquid crystal molecules of a liquid crystal display panel of the liquid crystal display device.
Figure 27:
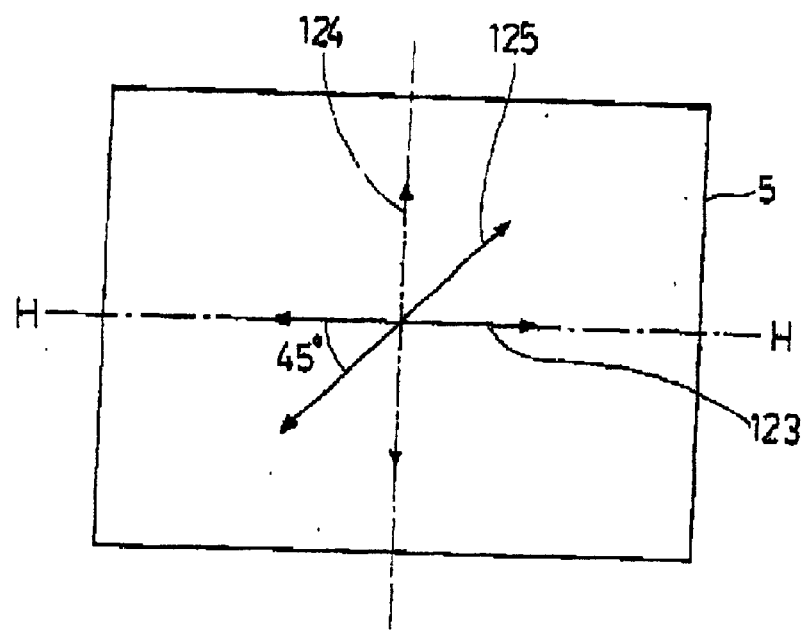
FIG. 27 is a view showing directions of the respective retardation axes of a first retardation film and a second retardation film, and a direction of the absorption axis of a polarizer, respectively disposed on a touch panel of the liquid crystal display device.

Ninth Embodiment: FIGS. 25 to 27

Next, a liquid crystal display device with an input panel attached thereto according to a ninth embodiment of a liquid crystal display device of the invention is described with reference to FIGS. 25 to 27.

FIG. 25 is a sectional view similar to FIG. 17, showing the constitution of the liquid crystal display device, FIG. 26 is a view showing alignment directions of liquid crystal molecules of a liquid crystal display panel, and FIG. 27 is a view showing directions of the respective retardation axes of a first retardation film and a second retardation film, and a direction of the absorption axis of a polarizer, disposed on a touch panel.

In FIG. 25, parts corresponding to those of the sixth embodiment, shown in FIG. 17, are denoted by like reference numerals, and description thereof is omitted or simplified. Further, parts other than those shown in FIGS. 25 to 27 are the same as those for the sixth embodiment, and therefore, description thereof is also omitted.

The present embodiment is characterized in that there is adopted an active-matrix type liquid crystal display panel provided with thin-film transistor (TFT) elements, each acting as a switching element, wherein a liquid crystal layer is driven through the intermediary of the TFT elements, and two sheets of retardation films are disposed on the visible side of a touch panel.

The liquid crystal display panel 104 of the liquid crystal display device shown in FIG. 25 is substantially the same as the liquid crystal display panel 104 of the sixth embodiment, shown in FIG. 17, and differs therefrom only in respect of the alignment direction of liquid crystal molecules in a liquid crystal layer 15. Accordingly, only this respect will be described hereinafter.

More specifically, twisted namatic (TN) liquid crystals are adopted in the liquid crystal layer 15 such that liquid crystal molecules on a first substrate 1 side are aligned in an upper liquid crystal molecule alignment direction 121 rotated through 45° counterclockwise relative to the horizontal axis H—H of a display screen 5 while liquid crystal molecules on a second substrate 6 side are aligned in a lower liquid crystal molecule alignment direction 122 rotated through 45° clockwise relative to the horizontal axis H—H described.

Each of pixels is provided with a TFT element 100 serving as a switching element, and it is possible to cause liquid crystal molecules to undergo a greater change in phase by applying an electric signal (voltage) to the liquid crystal layer 15 via the TFT element 100, so that brighter display is effected, and the number of the retardation films to be used can be reduced as compared with the case of employing supertwisted nematic (STN) liquid crystal. As a result, it is possible to prevent deterioration in sensitivity of the touch panel, and to reduce the thickness of the liquid crystal display device.

On the visible side of the first substrate 1 of the liquid crystal display panel 104, there is disposed a double-sided adhesive layer 44' made of an acrylic resin, which bonds the first substrate 1 to a lower substrate 26 of the touch panel 3' serving as an input panel. The double-sided adhesive layer 44' has no optical diffusibility as with the case of the sixth embodiment. The touch panel 3' is the same as that described in the seventh embodiment, shown in FIG. 19, and description thereof is therefore omitted.

On the viewer's side of an upper substrate 21 of the touch panel 3', there are disposed a second retardation film 49, a first retardation film 46, and a polarizer 45 in that order from the side of the touch panel 3' by laminating one on top of the other. Disposition angles and functions of these retardation films and the polarizer are the same as those for the seventh embodiment, and by the agency thereof, light reflected from constituent members of the touch panel 3' or from interfaces between the respective constituent members is caused to fall on the absorption axis of the polarizer 45, thereby preventing the light from going out to the viewer's side.

In the case of increasing the number of the display pixels of the liquid crystal display panel 104, the active matrix type liquid crystal display panel making use of the switching elements for driving the liquid crystal layer is effective, and if the active matrix type is adopted as with the present embodiment, a scope of selection for the retardation films installed in the liquid crystal display device can be widened.

Further, disposition angles as well as the retardation values of the retardation films and the reflector can be variously selected, and the liquid crystal layer of twisted alignment, parallel alignment, and so forth can be put to use. Accordingly, it becomes possible to make effective use of the constitution according to the present invention.

As the switching elements, not only the TFT elements but also thin-film diode (TFD) elements may be adopted. Further, it goes without saying that the same active matrix type liquid crystal display panel as described in the present embodiment may be applied to the liquid crystal display device according to any of the first to fifth embodiments, seventh, and eighth embodiments.

Variations to the First to Ninth Embodiments

Hereinafter, examples of variations to the first to ninth embodiments are described.

First, there have thus far been described the reflective liquid crystal display devices without an auxiliary light source installed therein except for the second and eighth embodiments, however, it is possible to convert the reflective liquid crystal display devices into transflective liquid crystal display devices by installing a transflective reflector (or a transflective reflecting electrode) as described in the second and eighth embodiments in place of the reflector (reflective electrode), and by installing an auxiliary light source on the side of the second substrate of the liquid crystal display panel, opposite from the visible side thereof, with a polarizer and a retardation film, if necessary, interposed therebetween.

Further, the transflective reflector thin in thickness and having a constant transmittance as a whole has been described in the foregoing, however, a reflector having little transmissiveness and provided with a multitude of openings each smaller than the pixel may be used instead.

The invention is also applicable to a liquid crystal display device wherein a light source is disposed on the outer periphery of a liquid crystal display panel and reflective display is effected by introducing light from the first substrate side of the liquid crystal display panel via an optical guide plate besides the transflective liquid crystal display device provided with the auxiliary light source disposed on the side of the liquid crystal display panel, opposite from the visible side, thereby obtaining the same advantageous effects as those of the aforementioned embodiments.

Further, the respective embodiments other than the third embodiment can have the same advantageous effects as those of the third embodiment by modifying respective constitutions such that a mutually sealing member and the inter-panel filling medium is provided in place of the double-sided adhesive layer.

Still further, with the seventh to ninth embodiments, the effect of reducing reflection in these embodiments can be further enhanced by sealing a liquid or gas having a refractive index greater than that of air as a filling medium in the gap between the upper substrate and the lower substrate of the touch panel In the case of employing the liquid crystal display panel of a single-polarizer type, bright display can be effected irrespective of the direction of a light source by providing the reflector with diffusiblity or by disposing a member having optical diffusibility between the reflector and the viewer. By disposing such an optical diffusion layer at a position closer to the reflector, defocusing of images in display can be prevented. Accordingly, with the embodiments wherein the member having optical diffusibility is not provided, a white diffusion film is preferably disposed by bonding or the member having optical diffusibility is provided by applying an optically diffusing material between the first substrate of the liquid crystal display panel and the lower substrate of the touch panel.

Further, an example has been described wherein, in the case of installing the retardation film between the upper substrate of the touch panel and the polarizer disposed closest to the viewer, the retardation films are disposed between the upper substrate and the polarizer. In such a case, however, if modification is made such that the retardation film of these retardation films, disposed closest to the liquid crystal display panel, can be employed so as to double as the upper substrate of the touch panel, the thickness of the constituent members disposed on the upper substrate can be reduced, thereby enabling the input sensitivity of the touch panel to be enhanced.

In the case of installing a plurality of retardation films between the first substrate of the liquid crystal display panel and the polarizer disposed closest to the viewer, reduction in the thickness of the liquid crystal display device can be realized by adopting a retardation film for both the upper and lower substrates, constituting the touch panel.

Even with such a constitution, there will arise no problem in respect of strength because the upper substrate side of the touch panel is reinforced by the polarizer or by the polarizer and the retardation film, and the lower substrate side of the touch panel is reinforced by the first substrate of the liquid crystal display panel.

Even with the touch panel disposed between the retardation films, if reflection is reduced by filling a gap therebetween with a filling medium, and a double-sided adhesive layer or an inter-panel filling medium is disposed between the lower substrate and the first substrate, this is sufficient for improvement in the display quality of the liquid crystal display panel.

Further, the seventh to ninth embodiments can be modified in constitution such that the second retardation film doubles as the upper substrate of the touch panel, and the inter-panel retardation film doubles as the lower substrate of the touch panel.

Still further, since the invention is more effective when applied to a color liquid crystal display device wherein display becomes darker in comparison with a monochromatic liquid crystal display device because of color filters installed in the former, the color liquid crystal display device has been described in the respective embodiments. Needless to say, however, the invention is also effective when applied to the monochromatic liquid crystal display device without color filters installed therein.

Tenth Embodiment: FIGS. 28 to 32

Next, a liquid crystal display device with an input panel attached thereto according to a tenth embodiment of a liquid crystal display device of the invention is described with reference to FIGS. 28 to 32.

Figure 28:
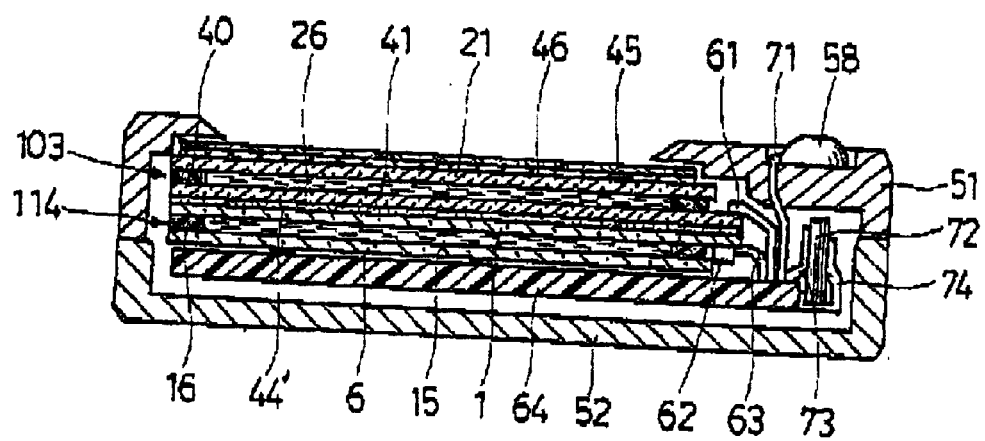
FIG. 28 is a sectional view similar to FIG. 3, showing the constitution of a portable information equipment incorporating a liquid crystal display device with an input panel attached thereto according to a tenth embodiment of a liquid crystal display device of the invention.
Figure 29:
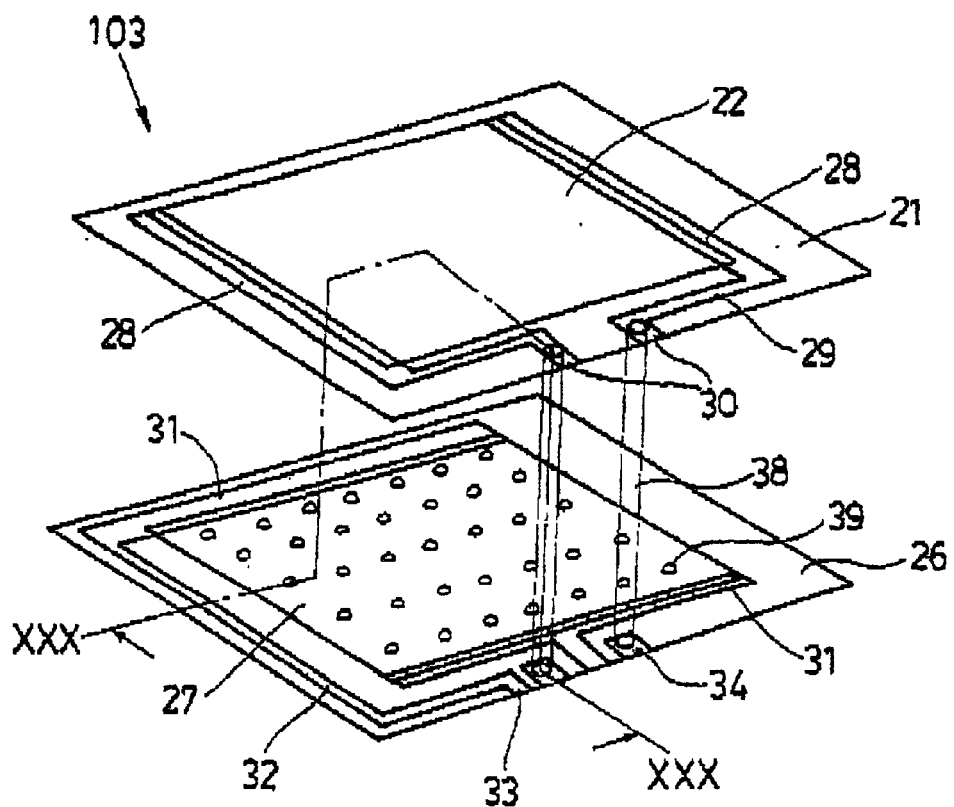
FIG. 29 is a schematic perspective view showing the exploded constitution of a touch panel of the liquid crystal display device described above.
Figure 30:
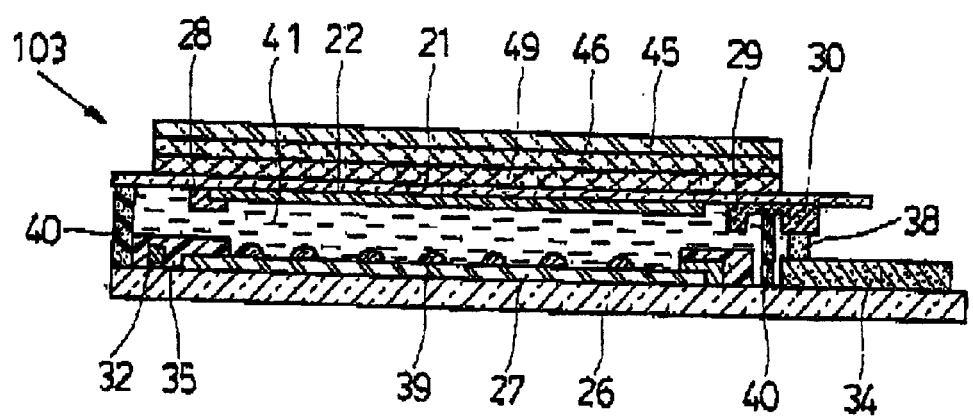
FIG. 30 is a schematic sectional view of the touch panel taken on line XXX—XXX of FIG. 29.
Figure 31:
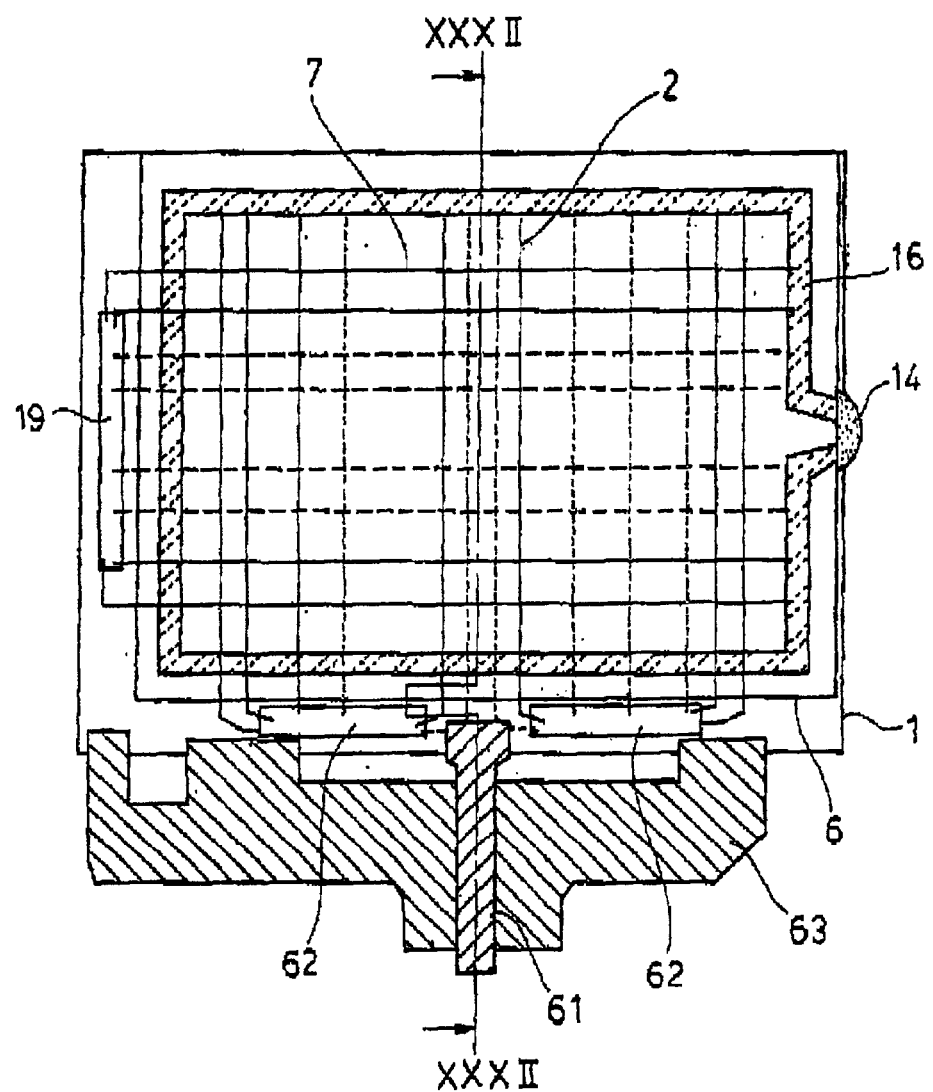
FIG. 31 is a schematic plan view showing a state where FPCs for connecting a driving circuit with the touch panel and a liquid crystal display panel, respectively, is mounted.
Figure 32:
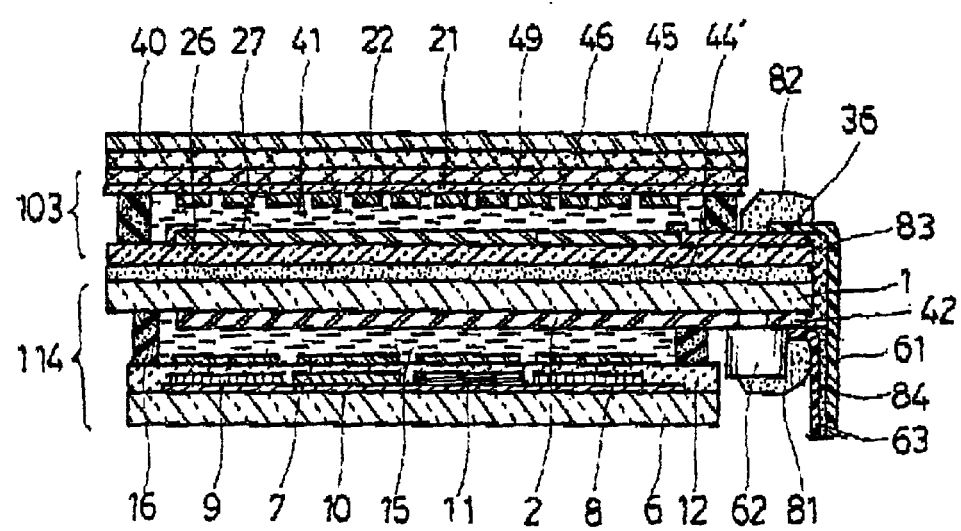
FIG. 32 is a schematic sectional view taken on line XXXII—XXXII of FIG. 31.

FIG. 28 is a sectional view similar to FIG. 3, showing the constitution of a portable information equipment incorporating the liquid crystal display device with the input panel attached thereto, FIG. 29 is a perspective view schematically showing the exploded constitution of a touch panel of the liquid crystal display device, FIG. 30 is a schematic sectional view of a touch panel, taken on line XXX—XXX of FIG. 29, FIG. 31 is a schematic plan view showing a state where FPCs for connecting a driving circuit with the touch panel and a liquid crystal display panel, respectively, is mounted, and FIG. 32 is a schematic sectional view taken on line XXXII–XXXII of FIG. 31.

In these figures, parts corresponding to those for the first embodiment are denoted by like reference numerals, and description thereof is omitted or simplified. Further, parts other than those shown in these figures are the same as those of the first embodiment, and description thereof is also omitted.

The present embodiment is characterized by the construction of the touch panel and the liquid crystal display panel, positions of connection portions between these constituent members and a circuit board, and the constitution thereof.

The portable information equipment shown in FIG. 28 is substantially the same in constitution as the portable information equipment according to the first embodiment, and connection of a communications sensor 58, respective buttons and a battery 72 with the circuit board 64 is also the same as with the case of the first embodiment.

With the liquid crystal display device with the input panel attached thereto, incorporated in this portable information equipment, there is disposed a touch panel 103 on the visible side of the liquid crystal display panel 114, bonded thereto with a double-sided adhesive layer 44' having no optical diffusibility, and on the visible side of the touch panel 103, there is disposed a twisted retardation film 46 and a polarizer 45. The disposition and constitution of the twisted retardation film 46 and the polarizer 45 are the same as those for the first embodiment, however, a connection structure of the touch panel 103 as well as the liquid crystal display panel 114 with the circuit board 64 differs from that for the first embodiment.

As shown in FIGS. 30 and 32, the touch panel 103 according to the tenth embodiment is formed such that a lower substrate 26 is larger in external shape than an upper substrate 21.

As shown in FIG. 29, on the underside of the upper substrate 21 made of glass, there are disposed upper electrodes 22 formed of a transparent and electrically conductive film, a pair of X-electrodes 28 made of silver paste, installed at both ends of the upper electrodes 22 in the X-axis direction, and X-wiring electrodes 29 as well as X-transfer electrodes 30, connected with the respective X-electrodes 28. The upper electrodes 22 have resistance of several hundred ohms (Ω), and the respective X-electrodes 28 have resistance of several ohms (Ω).

As shown in FIG. 30, the X-transfer electrodes 30 are disposed on peripheral parts of the upper substrate 21, and are electrically connected with respective X-connection electrodes 34 made of silver paste disposed on the lower substrate 26 via an electrically conductive paste 38 provided on the respective X-connection electrodes 34.

Further, as shown in FIG. 30, on the upper surface of a lower substrate 26, there is disposed a short-prevention insulation film 35 for prevention of short circuit with the electrodes installed on the upper substrate 21. Regions where the short-prevention insulation film 35 is disposed are parts opposite to the periphery of a lower electrode 27, the X-electrodes 28 or the X-wiring electrode 29.

On the lower substrate 26 made of glass, disposed opposite to the upper substrate 21, there is disposed the lower electrodes 27 made up of a transparent and electrically conductive film, a pair of Y-electrodes 31 made of silver paste, installed at both ends of the lower electrodes 27, in the Y-axis direction, and Y-wiring electrodes 32 as well as Y-connection electrodes 33, connected with the respective Y-electrodes 31. The lower electrode 27 has resistance of several hundred ohms (Ω), and the respective Y-electrodes 31 have resistance of several ohms (Ω). Further, as with the case of the first embodiment, dome-like spacers 39 are disposed on the lower electrode 27.

As shown in FIG. 32, in a peripheral region of the lower substrate 26, on one side thereof extending off the edge of the upper substrate 21, there is disposed an input panel connection portion 36 for connection with a touch panel flexible printed circuit (FPC) 61 to be connected with a circuit board 64 shown in FIG. 28, and in the region described, there are disposed the Y-connection electrodes 33 and the X-connection electrodes 34 for connection with the touch panel FPC 61 which is input panel connection means for connection with the circuit board 64. The Y-connection electrodes 33 and the X-connection electrodes 34 are connected to the touch panel FPC 61 with an anisotropic electrically conductive adhesive (not shown) composed of electrically conductive particles mixed in a thermosetting resin.

The upper substrate 21 and the lower substrate 26 may be made up of a plastic board formed of a transparent triacetylcellulose (TAC) film or a polyethyl sulfonate (PES) film.

With the liquid crystal display panel 114, a first substrate 1 is formed larger in external shape than a second substrate 6 as shown in FIGS. 31, and 32, and there is disposed a liquid crystal display panel connection portion 42 in a peripheral region of the first substrate 1, on one side thereof extending off the edge of the second substrate 6, on which an IC 62 for converting signals from the circuit board 64 into display signals of the liquid crystal display panel 114 is directly mounted by the chip on glass (COG) method.

Further, the liquid crystal display panel connection portion 42 is disposed in the peripheral region of the first substrate 1, on one side thereof on the same side where the input panel connection portion 36 is disposed, and the liquid crystal display panel 114 is connected with a liquid crystal display panel FPC 63 which is liquid crystal display panel connection means for connection with the circuit board 64, in that region. The circuit board 64 is provided with a driving circuit for the touch panel 103, and a driving circuit for the liquid crystal display panel 114.

Further, as shown in FIG. 31, a second IC 19 for applying predetermined waveforms to second electrodes 7 is provided on the first substrate 1, and connection electrodes (not shown) leading from the second IC 19 are connected with second electrodes 7 disposed on the second substrate 6 through electrical conduction between the upper and lower electrodes via electrically conductive particles of a sealing member 16 composed of the electrically conductive particles mixed in an insulating sealant.

In other respects, the liquid crystal display panel 114 is the same as the liquid crystal display panel 4 described in the first embodiment. Herein, wiring electrodes leading from the liquid crystal display panel FPC 63 to the IC 62 and the second IC 19, respectively, are omitted for illustration in the figures.

Further, the touch panel 103 is disposed such that the outer periphery of the lower substrate 26 thereof is positioned in the order of 200 to 400 $\mu$m inside from the outer periphery of the first substrate 1 of the liquid crystal display panel 114.

In addition, as shown in FIG. 32, the touch panel FPC 61 is disposed in such a way as to extend downward along the side face of the first substrate 1 as well as the lower substrate 26, and a part of the touch panel FPC 61, below the first substrate 1, overlaps the liquid crystal display panel FPC 63. The touch panel FPC 61 and the liquid crystal display panel FPC 63 are bonded together with a double sided tape 84 so as to strengthen the respective FPCs.

A touch panel reinforcing material 82 and a liquid crystal display panel reinforcing material 82 are applied to the connection portion where the touch panel 103 is connected with the touch panel FPC 61, and the connection portion where the liquid crystal display panel 114 is connected with the liquid crystal display panel FPC 63, respectively, and a mutual reinforcing material 83 is applied between the touch panel FPC 61 and the side face of the first substrate 1 as well as the lower substrate 26, thereby enhancing reliability of mounted parts, and preventing breakage of the respective substrates, particularly, the lower substrate 26 which is a thin glass substrate.

Incidentally, as shown in FIG. 29, with the touch panel 103, there are provided four lengths of the X-wiring electrodes 29 and the Y-wiring electrodes 32 altogether for wiring from the X-electrodes 28 and the Y-electrodes 31, respectively, up to the input panel connection portion 36 for connection with the circuit board 64, and all three lengths thereof, excluding the Y-wiring electrode 32 leading from the Y-electrode 31 disposed on the innermost side of the lower substrate 26, are disposed in a region where the same is horizontally overlapped by the liquid crystal display panel connection portion 42. Thus, by disposing at least three lengths among the X-wiring electrodes 29 and the Y-wiring electrodes 32 in the region where those are horizontally overlapped by the liquid crystal display panel connection portion 42, it becomes possible to provide a region large enough for routing wiring electrodes outside a display region.

It follows that the electrodes no longer need to be crossed at multi-levels or superimposed with an insulation film interposed therebetween because it becomes possible to provide a gap sufficient for prevention of electrical short-cut between the X-electrodes 28 as well as the Y-electrodes 31 and the respective wiring electrodes with respect to the touch panel 103. Accordingly, it becomes possible to prevent unevenness in the width of the gap between the upper substrate 21 and the lower substrate 26 due to variation in the thickness of the electrodes and the insulation film, thereby preventing distortion from occurring to images displayed by the liquid crystal display panel 114.

With the aforementioned liquid crystal display device according to the tenth embodiment, the connection portion where the touch panel 103 is connected with the circuit board 64 provided with the driving circuit for the touch panel 103, and the connection portion where the liquid crystal display panel 114 is connected with the circuit board 64 provided with the driving circuit for the liquid crystal display panel 114 are disposed on one side of the respective substrates, on the same side thereof, and the touch panel 103 and the liquid crystal display panel 114 are disposed such that respective regions thereof, necessary for connection, are superimposed. For this reason, particularly, in the case of executing mounting by the COG method or the chip on FPC (COF) method wherein at least areas for mounting ICs are required at connection portions with a circuit board, it becomes possible to secure a large display area for the liquid crystal display device.

Also, in the case of press-bonding the liquid crystal display panel FPC 63 to the liquid crystal display panel connection portion 42 of the liquid crystal display panel 114, or mounting the IC 62 by the COG method, breakage of the upper substrate 21 can be prevented because the upper substrate 21 of the touch panel 103 has no region horizontally overlapping the mounting part.

Further, since the lower substrate 26 of the touch panel 103 is bonded to the first substrate 1 of the liquid crystal display panel 114 with the double-sided adhesive layer 44', strength is increased, and no breakage occurs to the lower substrate 26 of the touch panel 103 even when retained.

Further, since the touch panel 103 is disposed such that the outer periphery of the lower substrate 26 thereof is positioned in the order of 400 μm inside from the outer periphery of the first substrate 1 of the liquid crystal display panel 114, breakage of the outer periphery of the lower substrate 26 as well can be prevented. When chamfering the outer periphery of the first substrate 1 of the liquid crystal display panel 114, no breakage occurs to the lower substrate 26 of the touch panel 103.

Therefore, the lower substrate 26 as well as the upper substrate 21 of the touch panel 103 can be formed of a thin glass sheet.

Further, as a result of connection of the touch panel 103 with the circuit board 64 being implemented along the side face of the first substrate 1 of the liquid crystal display panel 114 as well as the lower substrate 26, strength is increased in comparison with the case of, for example, the touch panel 103 alone retaining the FPC which is the connection means thereof, thereby increasing reliability.

It is further to be pointed out that the constitution of the liquid crystal display panel and the connection portions as described in the present embodiment is obviously applicable to the respective embodiments and variations thereof as described hereinbefore.

Figure 33:
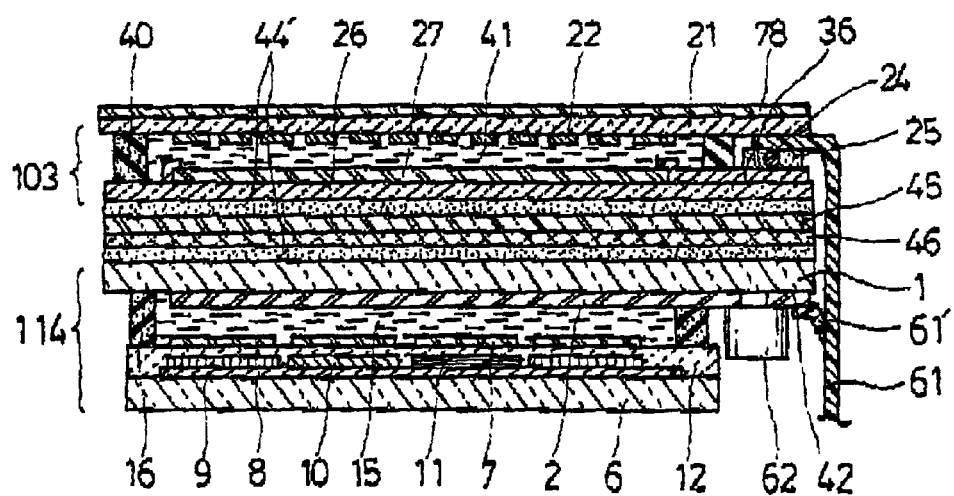
FIG. 33 is a sectional view similar to FIG. 32, showing the constitution of a liquid crystal display device with an input panel attached thereto according to an eleventh embodiment of a liquid crystal display device of the invention.

Eleventh Embodiment: FIG. 33

Next, a liquid crystal display device with an input panel attached thereto according to an eleventh embodiment of a liquid crystal display device of the invention is described with reference to FIG. 33.

FIG. 33 is a sectional view similar to FIG. 32, showing the constitution of the liquid crystal display device. In FIG. 33, parts corresponding to those for the tenth embodiment are denoted by like reference numerals, and description thereof is omitted or simplified. Further, parts other than those shown in FIG. 33 are the same as those of the first embodiment, and description thereof is also omitted.

The present embodiment is characterized in that a touch panel FPC is inserted between an upper substrate and a lower substrate of a touch panel to be securely attached thereto, the touch panel FPC and a liquid crystal display panel FPC are integrally formed, and the number of constituent members disposed on an input face of the touch panel is dispensed with as much as possible.

A liquid crystal display panel 114 of the liquid crystal display device shown in FIG. 33 is the same as the liquid crystal display panel 114 according to the tenth embodiment, and description thereof is therefore omitted.

On the visible side of a first substrate 1 of the liquid crystal display panel 114, there are disposed a double-sided adhesive layer 44', a retardation film 46, a polarizer 45, and a double-sided adhesive layer 44' in that order from the first substrate 1 side by laminating one on top of the other, and the double-sided adhesive layer 44' at the uppermost level is bonded to the lower substrate 26 made up of a thin glass sheet, constituting the touch panel 103.

Since the upper substrate 21 of the touch panel 103 is also made up of a thin glass sheet, there is disposed a protective film 78 on the visible side thereof for prevention of breakage. The protective film 78 is provided with a hard coat layer and an antireflection layer on the visible side thereof. Further, with the present embodiment as well, use is made of the double-sided adhesive layer 44' having no optical diffusibility.

The touch panel 103 is substantially the same in constitution as that for the tenth embodiment, but differs therefrom only in that the outer periphery of the upper substrate 21 is positioned 200 μm inside from the outer periphery of the lower substrate 26 and a peripheral region of the lower substrate 26, on one side thereof, is not allowed to extend far off the edge of the upper substrate 21.

With the present embodiment, the touch panel FPC 61 is bonded to an electrode of an input panel connection portion 36 disposed on the lower substrate 26 of the touch panel 103 with an anisotropic electrically conductive sealant 25 composed of electrically conductive particles 24 mixed in an insulating sealant. Such bonding is executed by applying thermal compression bonding to the upper substrate 21 and the lower substrate 26 with the touch panel FPC 61 sandwiched therebetween. The upper substrate 21 in the order of 0.1 mm in thickness is the best choice because the same undergoes deflection at this point in time.

Further, there is adopted a constitution wherein a liquid crystal display panel FPC 61', which is to be connected with a liquid crystal display panel connection portion 42 provided in the first substrate 1, is formed integrally with the touch panel FPC 61, and branch off at a midpoint to be connected with the first substrate 1.

With such a constitution as described above, a connection area for the respective FPCs, and a planar area of the respective FPCs themselves can be reduced. In addition, since the touch panel FPC 61 is inserted between the upper substrate 21 and the lower substrate 26, a terminal thereof made up of a silver electrode can be protected by sealing the periphery of the connection portion of the FPC with a silicone resin.

Further, two layers of the double-sided adhesive layers 44', the polarizer 45, and the retardation film 46 are disposed between the touch panel 103 and the liquid crystal display panel 114, so that the touch panel 103 and the liquid crystal display panel 114 can be formed in a unit, thereby enhancing the strength of the device.

Furthermore, with the aforementioned constitution having elasticity, even in the case where the upper substrate 21 comes into contact with the lower substrate 26 due to pressure applied by input provided from the upper substrate 21 side of the touch panel 103, and the lower substrate 26 undergoes deflection to some extent, such deflection of the lower substrate 26 is spread out before conveyed to the first substrate 1. As a result, the first substrate 1 undergoes little distortion, and distortion, if any, is hardly propagated to a liquid crystal layer 15, so that distortion of images in display can be prevented from occurring at the time of input provided to the touch panel.

It is further to be pointed out that the constitution of the liquid crystal display panel and the connection portions as described in the present embodiment is obviously applicable to the respective embodiments and variations thereof as described hereinbefore.

Figure 34:
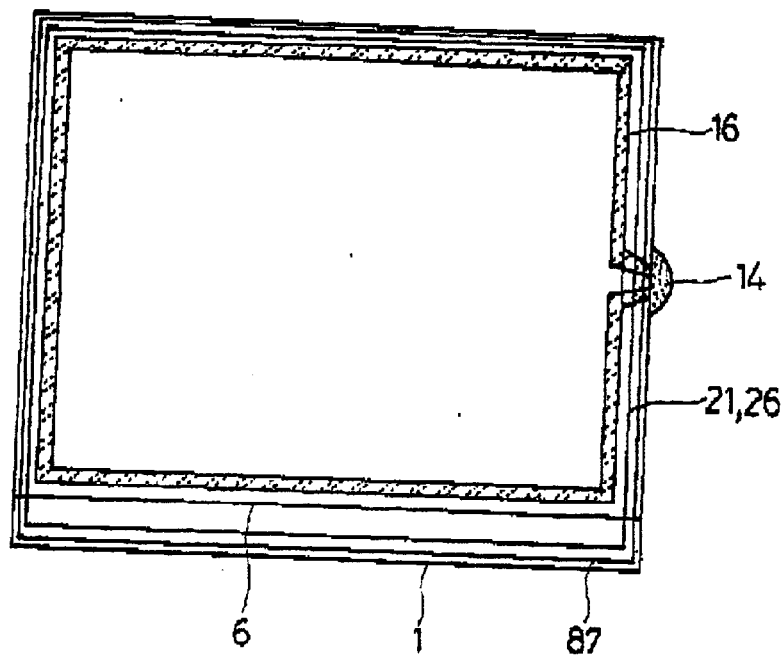
FIG. 34 is a plan view showing an external shape of a liquid crystal display panel, a touch panel, and a polarizing layer, respectively, of a liquid crystal display device with an input panel attached thereto according to a twelfth embodiment of a liquid crystal display device of the invention.
Figure 35:
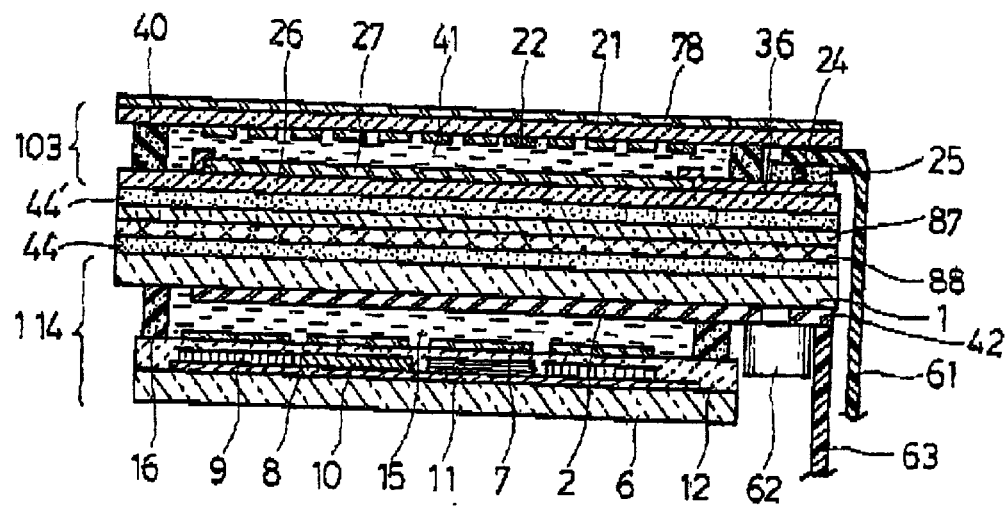
FIG. 35 is a sectional view similar to FIG. 32, showing the constitution of the liquid crystal display device with the input panel attached thereto as described above.

Twelfth Embodiment: FIGS. 34 and 35

Next, a liquid crystal display device with an input panel attached thereto according to a twelfth embodiment of a liquid crystal display device of the invention is described with reference to FIGS. 34 and 35.

FIG. 34 is a plan view showing external shapes of a liquid crystal display panel, a touch panel, and a polarizing layer, and FIG. 35 is a sectional view similar to FIG. 32, showing the constitution of the liquid crystal display device with the input panel attached thereto.

In FIG. 35, parts corresponding to those for the tenth embodiment, shown in FIGS. 28 to 32, are denoted by like reference numerals, and description thereof is omitted or simplified. Further, parts other than those shown in FIGS. 34 and 35 are the same as those of the tenth embodiment, and description thereof is also omitted.

The present embodiment is characterized in that the polarizing layer and a retardation layer, not retained by a protective layer, are installed.

The liquid crystal display panel 114 of the liquid crystal display device, shown in FIG. 35, is the same as the liquid crystal display panel 114 according to the tenth embodiment, shown in FIG. 32, and description thereof is therefore omitted.

On the visible side of a first substrate 1 of the liquid crystal display panel 114, there are disposed a double-sided adhesive layer 44 composed of styrene resin balls dispersed in an acrylic adhesive, having optical diffusibility due to the difference in refractive index between the acrylic adhesive and the styrene resin balls, the retardation layer 88, an adhesive layer (not shown), the polarizing layer 87, and a double-sided adhesive layer 44', having optical transmissiveness but no optical diffusibility, in that order by laminating one on top of the other, and the double-sided adhesive layer 44' at the uppermost level is bonded to a lower substrate 26 of the touch panel 103.

The polarizing layer 87 is made up of nothing but a polarizing layer, and unlike the polarizer, does not have a protective layer made up of an optically isotropic film of TAC or the like, provided on both sides thereof. Similarly, the retardation layer 88 is not provided with protective layers. The polarizing layer 87 and the retardation layer 88 are laminated with an adhesive, and are bonded to the lower substrate 26 of the touch panel 103 and the first substrate 1 of the liquid crystal display panel 114, with the double-sided adhesive layers 44' and 44, respectively. With such a constitution as described above, since the substrates on opposite sides are made of glass, it is possible to prevent moisture from making ingress into the device even if the protective layers are not provided.

The touch panel 103 is substantially the same in constitution as that according to the eleventh embodiment shown in FIG. 33, and as shown in FIG. 34, the periphery of an upper substrate 21 as well as the lower substrate 26 of the touch panel 103 is positioned 200 μm inside from respective sides of the polarizing layer 87 while the periphery of the first substrate 1 of the liquid crystal display panel 114 is positioned 300 μm outside from the respective sides of the polarizing layer 87. That is, the first substrate 1, the polarizing layer 87, and the touch panel 103 are disposed such that respective peripheries recede inward in that order.

With such a constitution as described above, it becomes possible to prevent breakage from occurring to the periphery of the touch panel 103 comprised of the substrates each made up of a thin glass sheet, thereby preventing the breakage which otherwise can occur when assembling the touch panel 103 into the liquid crystal display device.

Further, the liquid crystal display panel 114 is connected to a circuit board 64 provided with a driving circuit for driving the liquid crystal display panel 114 at a liquid crystal display panel connection portion 42 via a liquid crystal display panel FPC 63 with an anisotropic electrically conductive connector (not shown) composed of an insulating rubber and electrically conductive particles dispersed therein.

With the present embodiment, a touch panel FPC 61 is formed separately from the liquid crystal display panel FPC 63, however, neither a double sided tape nor a reinforcing material is provided. As with the case of the tenth embodiment, however, these constituent members may be provided, thereby improving reliability of the connections.

With the aforementioned constitution, distortion of images in display can be prevented from occurring at the time of input provided to the touch panel as with the case of the eleventh embodiment. Further, because the polarizing layer 87 and the retardation layer 88, without the protective layer provided on both sides thereof, are installed, a low-profile constitution can be realized while maintaining reliability. Furthermore, since the device has the constitution wherein these layers are laminated together with an adhesive, and both sides thereof are covered with a glass substrate having no permeability for moisture, respectively, there will occur no increase in permeability for moisture even at a high temperature in the order of, for example, 100° C., so that the polarizing layer 87 and the retardation layer 88 can maintain high moisture resistance.

It is further to be pointed out that the constitution of the liquid crystal display panel as well as the connection portions, the polarizing layer, the retardation layer, and so forth as described in the present embodiment is obviously applicable to the respective embodiments and variations thereof as described hereinbefore.

Figure 36:
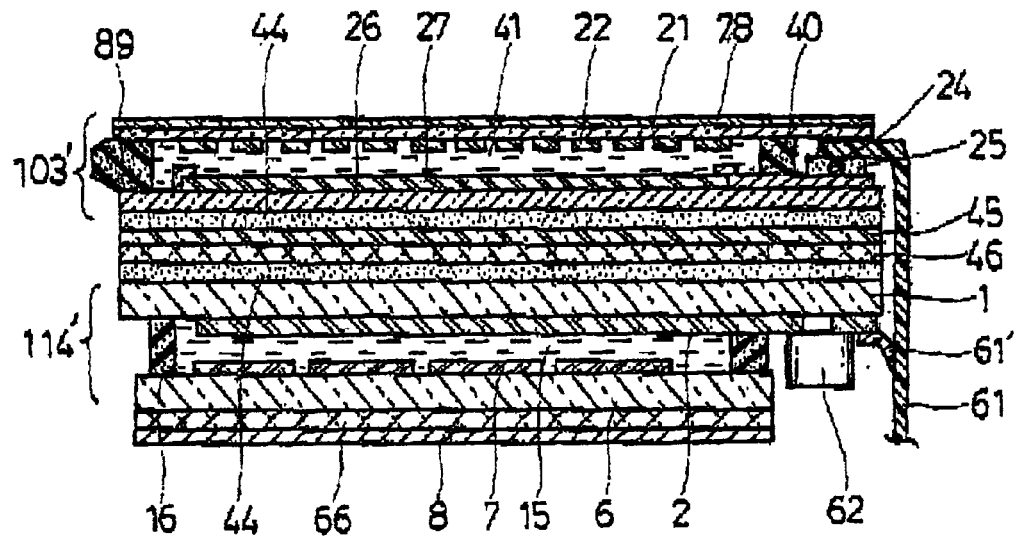
FIG. 36 is a sectional view similar to FIG. 32, showing the constitution of a liquid crystal display device with an input panel attached thereto according to a thirteenth embodiment of a liquid crystal display device of the invention.

Thirteenth Embodiment: FIG. 36

Next, a liquid crystal display device with an input panel attached thereto according to a thirteenth embodiment of a liquid crystal display device of the invention is described with reference to FIG. 36.

FIG. 36 is a sectional view similar to FIG. 32, showing the constitution of the liquid crystal display device. In FIG. 36, parts corresponding to those for the tenth embodiment, shown in FIGS. 28 to 32, are denoted by like reference numerals, and description thereof is omitted or simplified. Further, parts other than those shown in FIG. 36 are the same as those of the tenth embodiment, and description thereof is also omitted.

The present embodiment is characterized in that an upper substrate and a lower substrate of a touch panel are film substrates, and a first substrate and a second substrate of a liquid crystal display panel are plastic substrates, thereby rendering respective constituent members bendable.

The liquid crystal display panel 114' of the liquid crystal display device shown in FIG. 36 is substantially the same in constitution as the liquid crystal display panel 114 according to the tenth embodiment, however, the first substrate 1 and the second substrate 6 are made up of a transparent plastic substrate of 0.3 mm thick, respectively. Further, the second substrate 6 is provided with a silicon oxide ($SiO_2$) film (not shown) as a gas barrier layer. Further, with the present embodiment, a second polarizer 66 is disposed on the side of the second substrate 6, opposite from the visible side thereof, and on the underside thereof, a reflector 8 is disposed by vapor deposition using the vacuum sputtering method, while no color filter is installed.

On the visible side of the first substrate 1 of the liquid crystal display panel 114', there are disposed a double-sided adhesive layer 44 having optical diffusibility, a retardation film 46, a polarizer 45, and a double-sided adhesive layer 44' having no optical diffusibility in that order from the side of the first substrate 1 by laminating one on top of the other, and the double-sided adhesive layer 44' at the uppermost level is bonded to the lower substrate 26 of the touch panel 103'.

The touch panel 103' is substantially the same in constitution as the touch panel 103 according to the eleventh embodiment shown in FIG. 33, but differs therefrom in that the upper substrate 21 and the lower substrate 26 are each made up of a transparent film of 0.18 μm thick, and substantially identical peripheries thereof are superimposed one on the other. Further, because the upper substrate 21 is thin in thickness, the same is protected by a protective film 78 provided with a hard coat layer and an antireflection layer as with the case of the other embodiments.

A gap between the upper substrate 21 and the lower substrate 26 is filled with a filling medium composed of, for example, siloxane. Reference numeral 89 denotes a closing member for closing an inlet for injecting the filling medium therethrough, which is the same as a closing member 14 of the liquid crystal display panel, shown in FIG. 34.

The touch panel 103' and the liquid crystal display panel 114' as described above are connected to a circuit board 64 with a touch panel FPC 61 and a liquid crystal display panel FPC 61', integrally formed as with the eleventh embodiment, respectively.

With the aforementioned constitution, distortion of images in display can be prevented from occurring at the time when an input is provided to the touch panel 103' as with the case of the eleventh embodiment. Further, since the respective substrates of the touch panel 103' are film substrates, and the respective substrates of the liquid crystal display panel 114' are transparent plastic substrates, the device has a construction light in weight and insusceptible to cracking.

Furthermore, because the polarizer 45 and the retardation film 46, disposed between the touch panel 103' and the liquid crystal display panel 114' are also films, it is possible to bend these panels as a whole, and when disposing the retardation film 46, the polarizer 45, and the touch panel 103' on the liquid crystal display panel 114' by laminating one on top of the other, there occurs inclusion of few air bubbles, enabling the constitution to be low in profile.

Yet further, if the plastic substrates used for the liquid crystal display panel 114' are provided with a gas barrier layer and a moisture barrier layer, it is also possible to employ a polarizing layer and a retardation layer, formed by removing a protective layer from the polarizer 45 and the retardation film 46, respectively, as with the case of the twelfth embodiment. Non-permeability for moisture can be reinforced by a liquid crystal layer 15 and the filling medium 41 of the touch panel 103'.

With the use of a polarizer for the lower substrate 26 of the touch panel 103', the construction of the device can be rendered further lower in profile.

Otherwise, if the upper substrate 21 and the lower substrate 26 of the touch panel 103' are each made up of an optically isotropic film, and the retardation film 46 and the polarizer 45 are disposed in that order on the upper substrate 21 by laminating one on top of the other, this will enable scratches, if any, on the upper substrate 21 to be hidden, and the appearance of the touch panel 103' to be enhanced.

It is further to be pointed out that the constitution of the liquid crystal display panel as well as the connection portions, the polarizer, and so forth, as described in the present embodiment is obviously applicable to the respective embodiments and variations thereof as described hereinbefore.

Figure 37:
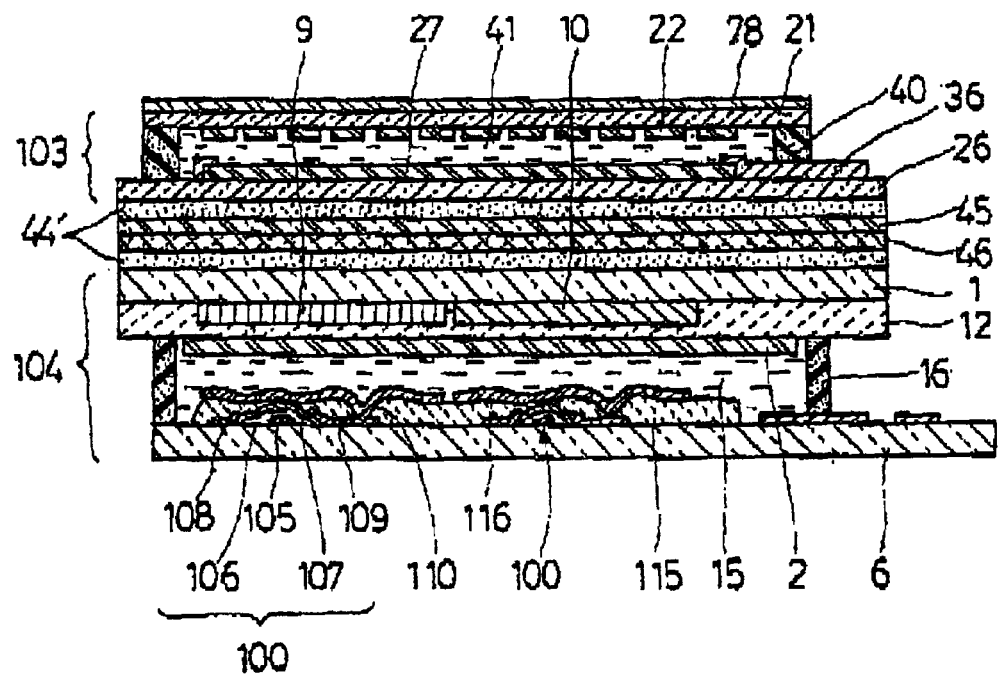
FIG. 37 is a sectional view similar to FIG. 17, showing the constitution of a liquid crystal display device with an input panel attached thereto according to a fourteenth embodiment of a liquid crystal display device of the invention.

Fourteenth Embodiment: FIG. 37

Next, a liquid crystal display device with an input panel attached thereto according to a fourteenth embodiment of a liquid crystal display device of the invention is described with reference to FIG. 37.

FIG. 37 is a sectional view corresponding to FIG. 17, showing the constitution of the liquid crystal display device. In FIG. 37, parts corresponding to those for the sixth embodiment, shown in FIG. 17, and those for the tenth embodiment, shown in FIGS. 28 to 32, are denoted by like reference numerals, and description thereof is omitted or simplified. Further, parts other than those shown in FIG. 37 are the same as those of the tenth embodiment, and description thereof is also omitted.

The liquid crystal display panel 104 of the liquid crystal display device, shown in FIG. 37, is the same in constitution as the liquid crystal display panel 104 according to the sixth embodiment shown in FIG. 17, and description thereof is therefore omitted. That is, unlike the cases of the tenth to twelfth embodiments, the liquid crystal display panel 104 is an active-matrix type liquid crystal display panel provided with TFT elements 100 disposed on a second substrate 6 thereof so as to correspond to respective pixels, each acting as a switching element. The second substrate 6 is formed so as to be larger in surface area than a first substrate 1, thereby enabling connection to a circuit board 64 comprising a driving circuit to be implemented on the second substrate 6 although illustration of an FPC is omitted in FIG. 37.

As shown in FIG. 37, on the visible side of the first substrate 1 of the liquid crystal display panel 104, there are disposed a double-sided adhesive layer 44' made of an acrylic resin and having no optical diffusibility, a retardation film 46, a polarizer 45, and a double-sided adhesive layer 44' in that order from the side of the first substrate 1 by laminating one on top of the other.

Then, the same touch panel 103 as described in the tenth embodiment is bonded to the visible side of the double-sided adhesive layer 44' at the uppermost level.

In addition, the visible side surface of the upper substrate 21 of the touch panel 103 is protected by a protective film 78 provided with a hard coat layer and an antireflection layer.

Thus, with the present embodiment, a lower substrate 26 of the touch panel 103 and the first substrate 1 of the liquid crystal display panel 104 are bonded together through the intermediary of the double-sided adhesive layers 44', the polarizer 45, and so forth, to form the touch panel 103 and the liquid crystal display panel 104 in a unit, so that it is convenient and preferable to install a transparent and electrically conductive film as a first electrode of the liquid crystal display panel 104 substantially on the entire inner surface of the first substrate 1.

A plurality of pixel electrodes served by reflective electrodes 116 are arranged in a matrix fashion, and the TFT element 100 acting as the switching element is preferably installed against the respective pixel electrodes Variations to the Tenth to Fourteenth Embodiments Examples of variations to the tenth to fourteenth embodiments as described hereinbefore will be described hereinafter.

First, in the case of installing the protective film on the upper substrate 21 of the touch panel, use of a polarizer for the protective film enables visibility for scratches and stains on the upper substrate 21 to be reduced in comparison with the case of installing the polarizer between the touch panel and the liquid crystal display panel. Further, in such a case, since a quantity of incoming light falling on the touch panel is reduced by the agency of the polarizer, it also becomes possible to reduce visibility for dust, and so forth, inside the touch panel.

If the polarizer and the retardation film are installed on an input face (the visible side of the upper substrate) of the touch panel, it is conceivable that this will cause input sensitivity to deteriorate due to the effect of the protective film installed above and below those constituent members. Accordingly, in the case of installing the polarizer and the retardation film on the input face of the touch panel, it is preferable to install a polarizing layer and a retardation layer, without a protective layer attached thereto, as in the case of twelfth embodiment, and to install a protective film on the uppermost surface thereof.

For example, in the case of installing one sheet of polarizer, a first adhesive layer, a polarizing layer, a second adhesive layer, and a protective film are preferably disposed in that order by laminating one on top of the other. In the case of installing the retardation film and the polarizer, at least one retardation layer, a first adhesive layer, a polarizing layer, a second adhesive layer, and a protective film are preferably disposed in that order by laminating one on top of the other. Otherwise, a hard coat layer or an antireflection layer may be formed directly on a polarizing layer instead of installing a protective film. With the constitutions as described above, the input sensitivity of the touch panel can be enhanced.

Besides the examples of the variations described above, the same as the examples of the variations to the first to ninth embodiments can also be applied to the tenth to fourteenth embodiments.

As described in the foregoing, with the liquid crystal display device according to the invention, wherein the touch panel is disposed on the visible side of the liquid crystal display panel so as to overlay the latter, and display of the liquid crystal display panel is watched through the input panel, it is possible to prevent deterioration of visibility of the liquid crystal display panel due to the effect of the input panel, and also, to realize reduction in the number of the constituent members absorbing light, reduction in weight, a lower profile, reduction in cost, prevention of distortion of images in display, enhanced contrast, enhanced strength, and so forth.

What is claimed is:

1. A liquid crystal display device comprising:
   a liquid crystal display panel made up by coupling a first substrate and a second substrate, having an electrode provided on respective inner surfaces thereof facing each other, with a predetermined gap provided therebetween, and by filling the gap with a liquid crystal layer; and
   an input panel for detecting input information with a structure made up by coupling an upper substrate and a lower substrate, both of which are transparent, each having an electrode provided on respective inner surfaces thereof facing each other, with a predetermined gap provided therebetween, wherein upon depression on the upper substrate, each of the electrode come in contact thus achieving the detecting input information effect;
   wherein the first substrate on a visible side of the liquid crystal display panel being disposed so as to be opposed to the lower substrate of the input panel;
   a double-sided adhesive layer having a surface area equivalent to that of a display region of the liquid crystal display panel is disposed between the first substrate and the lower substrate;
   a second retardation film, a first retardation film, and a first polarizer are disposed in that order by laminating one on top of the other from an upper substrate side of the input panel on a visible side of the upper substrate, and
   wherein the first retardation film is a half-wave film and the second retardation film is a quarter-wave film.

2. A liquid crystal display device according to claim 1, wherein the gap between the upper substrate and the lower substrate of the input panel is filled with a filling medium.

3. A liquid crystal display device according to claim 1, wherein the double-sided adhesive layer has optical diffusibility.

4. A liquid crystal display device according to claim 1, wherein the double-sided adhesive layer is more elastic than spacers or a sealing member for maintaining the gap of the liquid crystal display panel.

5. A liquid crystal display device according to claim 1, wherein a reflector or a transflective reflector is disposed on a face of the second substrate of the liquid crystal display panel, on a side of the liquid crystal layer, and at least one sheet of retardation film and one sheet of polarizer are disposed in that order from an upper substrate side on a visible side of the upper substrate of the input panel.

6. A liquid crystal display device according to claim 5, wherein the retardation films include at least one sheet of twisted retardation film.

7. A liquid crystal display device according to claim 1, wherein a transflective reflector is disposed on a face of the second substrate of the liquid crystal display panel, on a side of the liquid crystal layer, at least one sheet of retardation film and one sheet of polarizer are disposed in that order from an upper substrate side on a visible side of the upper substrate of the input panel, and an auxiliary light source is disposed on a side of the second substrate, opposite from the side of the liquid crystal layer, with a polarizer interposed therebetween.

8. A liquid crystal display device according to claim 1, wherein switching elements are disposed on the first substrate or the second substrate of the liquid crystal display panel, and display is effected by the liquid crystal display panel by applying electric signals to the liquid crystal layer via the switching elements.

9. A liquid crystal display device according to claim 1, wherein the upper substrate as well as the lower substrate of the input panel is a retardation film.

10. A liquid crystal display device according to claim 1, wherein the upper substrate and the lower substrate of the input panel are substrates having a substantially even retardation value within planes thereof or optically isotropic substrates having a retardation value nearly at zero, respectively.

11. A liquid crystal display device according to claim 1, wherein the input panel is provided with positioning marks for aligning an absorption axis of the first polarizer with an alignment direction of liquid crystal molecules of the liquid crystal layer of the liquid crystal display panel.

12. A liquid crystal display device according to claim 1, wherein the upper substrate of the input panel, the second retardation film, the first retardation film, and the first polarizer are bonded to each other with an adhesive.

13. A liquid crystal display device according to claim 1, wherein an external shape of the first polarizer is equivalent in size to or smaller than that of the first retardation film, the second retardation film, and the upper substrate of the input panel, respectively.

14. A liquid crystal display device according to claim 1,
   wherein a first adhesive layer, a polarizing layer not retained by a protective layer, a second adhesive layer and a protective film are disposed in that order from an upper substrate side by laminating one on top of the other on a visible side of the upper substrate of the input panel.

15. A liquid crystal display device according to claim 1,
   wherein a first adhesive layer, at least one layer of retardation layer not retained by a protective layer, a second adhesive layer, a polarizing layer not retained by a protective layer, a third adhesive layer and a protective film are disposed in that order from an upper substrate side by laminating one on top of the other on a visible side of the upper substrate of the input panel.

16. A liquid crystal display device according to claim 1, said liquid crystal display device further comprises: a second retardation film, a first retardation film, and a first polarizer are disposed in that order by laminating one on top of the other from an upper substrate side of the input panel on a visible side of the upper substrate;

wherein a liquid crystal display panel connection portion for connecting the liquid crystal display panel to a driving circuit for the liquid crystal display panel is disposed in a peripheral region of the first substrate of the liquid crystal display panel, on one side thereof while an input panel connection portion for connecting the input panel to a driving circuit for the input panel is disposed in a peripheral region of the lower substrate of the input panel, on one side thereof, said one side of the first substrate where the liquid crystal display panel connection portion is disposed is on the same side as said one side of the lower substrate where the input panel connection portion is disposed, said one side of the lower substrate where the input panel connection portion is disposed is positioned on an inner side of said one side of the first substrate where the liquid crystal display panel connection portion is disposed, and an input panel connection means for connecting the input panel connection portion and the driving circuit for the input panel is installed along a side face of the lower substrate and the first substrate.

17. A liquid crystal display device comprising:

a liquid crystal display panel made up by coupling a first substrate and a second substrate, having an electrode provided on respective inner surfaces thereof facing each other, with a predetermined gap provided therebetween, and by filling the gap with a liquid crystal layer; and an input panel made up by coupling an upper substrate and a lower substrate, both of which are transparent, having an electrode provided on respective inner surfaces thereof facing each other, with a predetermined gap provided therebetween, wherein the first substrate on a visible side of the liquid crystal display panel being disposed so as to be opposed to the lower substrate of the input panel, and a double-sided adhesive layer having a surface area equivalent to that of a display region of the liquid crystal display panel is disposed between the first substrate and the lower substrate, wherein a liquid crystal display panel connection portion for connecting the liquid crystal display panel to a driving circuit for the liquid crystal display panel is disposed in a peripheral region of the first substrate of the liquid crystal display panel, on one side thereof while an input panel connection portion for connecting the input panel to a driving circuit for the input panel is disposed in a peripheral region of the lower substrate of the input panel, on one side thereof, said one side of the first substrate where the liquid crystal display panel connection portion is disposed is on the same side as said one side of the lower substrate where the input panel connection portion is disposed, and an input panel connection means for connecting the input panel connection portion and the driving circuit for the input panel is installed along a side face of the lower substrate and the first substrate.

18. A liquid crystal display device comprising:

a liquid crystal display panel made up by coupling a first substrate and a second substrate, having an electrode provided on respective inner surfaces thereof facing each other, with a predetermined gap provided therebetween, and by filling the gap with a liquid crystal layer; and an input panel made up by coupling an upper substrate and a lower substrate, both of which are transparent, having an electrode provided on respective inner surfaces thereof facing each other, with a predetermined gap provided therebetween, wherein the first substrate on a visible side of the liquid crystal display panel being disposed so as to be opposed to the lower substrate of the input panel, and a double-sided adhesive layer having a surface area equivalent to that of a display region of the liquid crystal display panel is disposed between the first substrate and the lower substrate, wherein the input panel is provided with at least four units of electrodes for detection of position, comprising at least a pair of X-electrodes and at least a pair of Y-electrodes, and wiring electrodes for providing wiring between each of the electrodes for detection of position and an input panel connection portion for connecting the input panel to a driving circuit therefor, and at least three lengths of the wiring electrodes are disposed in a region where the same horizontally overlay a liquid crystal display panel connection portion for connecting the liquid crystal display panel to a driving circuit therefor as seen from a visible side.

19. A liquid crystal display device comprising:

a liquid crystal display panel made up by coupling a first substrate and a second substrate, having an electrode provided on respective inner surfaces thereof facing each other, with a predetermined gap provided therebetween, and by filling the gap with a liquid crystal layer; and an input panel for detecting input information with a structure made up by coupling an upper substrate and a lower substrate, both of which are transparent, each having an electrode provided on respective inner surfaces thereof facing each other, with a predetermined gap provided therebetween, wherein upon depression on the upper substrate, each of the electrode come in contact thus achieving the detecting input information effect;

wherein the first substrate on a visible side of the liquid crystal display panel being disposed so as to be opposed to the lower substrate of the input panel;

a double-sided adhesive layer having a surface area equivalent to that of a display region of the liquid crystal display panel is disposed between the first substrate and the lower substrate;

a second retardation film, a first retardation film, and a first polarizer are disposed in that order by laminating one on top of the other from an upper substrate side of the input panel on a visible side of the upper substrate;

wherein a liquid crystal display panel connection portion for connecting the liquid crystal display panel to a driving circuit for the liquid crystal display panel is disposed in a peripheral region of the first substrate of the liquid crystal display panel, on one side thereof while an input panel connection portion for connecting the input panel to a driving circuit for the input panel is disposed in a peripheral region of the lower substrate of the input panel, on one side thereof, said one side of the first substrate where the liquid crystal display panel connection portion is disposed on the same side as said one side of the lower substrate where the input panel connection portion is disposed, said one side of the lower substrate where the input panel connection portion is disposed is positioned on an inner side of said one side of the first substrate where the liquid crystal display panel connection portion is disposed, and an input panel connection means for connecting the input panel connection portion and the driving circuit for the input panel is installed along a side face of the lower substrate and the first substrate.

* * * * *